United States Patent
Määttänen et al.

(10) Patent No.: US 11,871,332 B2
(45) Date of Patent: Jan. 9, 2024

(54) METHODS FOR TRACKING AREA MANAGEMENT FOR MOVING RAN

(71) Applicant: Telefonaktiebolaget LM Ericsson (PUBL), Stockholm (SE)

(72) Inventors: Helka-Liina Määttänen, Helsinki (FI); Henrik Rydén, Solna (SE); Xingqin Lin, Santa Clara, CA (US); Yi-Pin Eric Wang, Fremont, CA (US); Gino Luca Masini, Stockholm (SE); Stefan Rommer, Västra Frölunda (SE); Björn Hofström, Linköping (SE); Jonas Sedin, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 233 days.

(21) Appl. No.: 17/290,314

(22) PCT Filed: Oct. 14, 2019

(86) PCT No.: PCT/SE2019/051009
§ 371 (c)(1),
(2) Date: Apr. 30, 2021

(87) PCT Pub. No.: WO2020/091647
PCT Pub. Date: May 7, 2020

(65) Prior Publication Data
US 2022/0007267 A1    Jan. 6, 2022

Related U.S. Application Data

(60) Provisional application No. 62/754,429, filed on Nov. 1, 2018.

(51) Int. Cl.
H04W 4/00      (2018.01)
H04W 48/10     (2009.01)
(Continued)

(52) U.S. Cl.
CPC ........ H04W 48/10 (2013.01); H04B 7/18545 (2013.01); H04W 60/02 (2013.01); H04W 68/005 (2013.01); H04W 84/005 (2013.01)

(58) Field of Classification Search
CPC ... H04W 48/10; H04W 60/02; H04W 68/005; H04W 84/005; H04W 16/12;
(Continued)

(56) References Cited

U.S. PATENT DOCUMENTS 5,396,643 A * 3/1995 Frenzer .............. H04B 7/18567
455/13.1
5,410,728 A * 4/1995 Bertiger ............. H04B 7/18521
455/13.1

(Continued)

OTHER PUBLICATIONS

3GPP TR 38.821 v0.2.0; Technical Report; 3rd Generation Partnership Project; Technical Specification Group Radio Access Network; Solutions for NR to support non-terrestrial networks (NTN) Release 16—Oct. 2018.

(Continued)

*Primary Examiner* — Stephen M D Agosta
(74) *Attorney, Agent, or Firm* — Christopher & Weisberg, P.A.

(57) ABSTRACT

A method performed by a network node (160) includes serving a cell area by a first physical network node for a first time duration. The first physical network node uses an identifier of a logical network node. For a second time duration, the cell area is served by a second physical network node. The second physical network node uses the identifier of the logical network node. The first physical network node serves the cell area with a first frequency band and the second physical network node serves the cell area with a second frequency band.

13 Claims, 19 Drawing Sheets

(51) Int. Cl.
*H04B 7/185* (2006.01)
*H04W 60/02* (2009.01)
*H04W 68/00* (2009.01)
*H04W 84/00* (2009.01)

(58) Field of Classification Search
CPC ....... H04W 84/06; H04W 60/00; H04W 8/26; H04B 7/18513; H04B 7/18526; H04B 7/18545
See application file for complete search history.

(56) References Cited

U.S. PATENT DOCUMENTS

| | | | | | |
|---|---|---|---|---|---|
| 5,469,468 | A | * | 11/1995 | Schilling | H04B 7/2631 370/320 |
| 5,519,706 | A | * | 5/1996 | Bantz | H04L 9/0844 455/435.2 |
| 5,826,190 | A | * | 10/1998 | Krutz | H04B 7/18541 455/437 |
| 6,052,586 | A | * | 4/2000 | Karabinis | H04B 7/18563 455/12.1 |
| 6,414,944 | B1 | * | 7/2002 | Kolev | H04B 7/18539 370/316 |
| 6,765,953 | B1 | * | 7/2004 | Harms | H04B 1/70756 375/150 |
| 10,177,837 | B2 | * | 1/2019 | Ravishankar | H04B 7/18513 |
| 10,813,078 | B2 | * | 10/2020 | Ravishankar | H04W 68/02 |
| 2006/0040639 | A1 | * | 2/2006 | Karl | H04W 76/50 455/414.1 |
| 2008/0242339 | A1 | * | 10/2008 | Anderson | H04B 7/18543 455/522 |
| 2008/0254812 | A1 | * | 10/2008 | Kitazoe | H04W 48/08 455/456.2 |
| 2009/0098884 | A1 | * | 4/2009 | Casati | H04W 60/04 455/456.1 |
| 2010/0075698 | A1 | * | 3/2010 | Rune | H04W 68/08 455/458 |
| 2010/0105380 | A1 | * | 4/2010 | Attar | H04W 48/16 455/434 |
| 2011/0117916 | A1 | * | 5/2011 | Dahlen | H04W 48/02 455/436 |
| 2011/0158165 | A1 | * | 6/2011 | Dwyer | H04W 60/00 370/328 |
| 2012/0007776 | A1 | * | 1/2012 | Ariel | G01S 19/11 342/357.48 |
| 2012/0214493 | A1 | * | 8/2012 | Suh | H04W 36/0066 455/437 |
| 2016/0149599 | A1 | * | 5/2016 | Lindsay | H04B 7/195 455/13.1 |
| 2017/0366251 | A1 | * | 12/2017 | Ravishankar | H04B 7/18513 |
| 2018/0317163 | A1 | * | 11/2018 | Lee | H04W 48/18 |
| 2023/0123664 | A1 | * | 4/2023 | Liu | G06T 5/20 382/284 |

OTHER PUBLICATIONS

3GPP TS 38.300 v15.3.1; Technical Specification; 3rd Generation Partnership Project; Technical Specification Group Radio Access Network; NR; NR and NG-RAN Overall Description; Stage 2 (Release 15)—Oct. 2018.

PCT International Preliminary Report on Patentability issued for International application No. PCT/SE2019/051009—dated Jan. 20, 2021.

3GPP TSG-RAN WG3 #101bis; Chengdu, China; Source: Nokia, Nokia Shanghai Bell; Title: Paging issues in NTN (R3-185700)—Oct. 8-12, 2018.

3GPP TSG-RAN3 Meeting #101bis; Chengdu, China; Title: The issue of paging in NTN; Source: Huawei (R3-185706)—Oct. 8-12, 2018.

3GPP TSG-RAN WG3 Meeting #101bis; Chengdu, China; Title: NR-NTN: Tracking Areas and Paging in NGSO Satellite Systems; Source: Fraunhofer IIS, Fraunhofer HHI (R3-185849)—Oct. 8-12, 2018.

3GPP TSG-RAN WG3 #102; Spokane, WA, USA; Source: Ericsson; Title: Are Tracking Areas Stationary or Not? (R3-186828)—Nov. 12-16, 2018.

3GPP TSG-RAN WG3 #103; Athens, Greece; Source: Ericsson; Title: Switching the Feeder Link Toward the Satellite (R3-190812)—Feb. 25-Mar. 1, 2019.

3GPP TSG RAN meeting #80; La Jolla, USA; Source: Thales; Title: Study on solutions evaluation for NR to support Non Terrestrial Network (RP-181370)—Jun. 11-14, 2018.

PCT International Search Report issued for International application No. PCT/SE2019/051009—dated Mar. 12, 2020.

3GPP TR 38.811 v15.1.0; Technical Report; 3rd Generation Partnership Project; Technical Specification Group Radio Access Network; Study on New Radio (NR) to support non-terrestrial networks (Release 15)—Jun. 2019.

PCT Written Opinion of the International Searching Authority issued for International application No. PCT/SE2019/051009—dated Mar. 12, 2020.

* cited by examiner

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN Node Name | O | | PrintableString (SIZE1..150...) | | YES | ignore |
| Supported TA List | | 0..1 | | Supported TAs in the NG-RAN node. | YES | reject |
| >Supported TA Item | | 1..<maxnoofTACs> | | | - | |
| >>TAC | M | | 9.3.3.10 | Broadcast TAC | - | |
| >>Broadcast PLMN List | | 1..<maxnoofBPLMNs> | | | - | |
| >>>Broadcast PLMN Item | M | | | Broadcast PLMN | - | |
| >>>>PLMN Identity | M | | 9.3.3.5 | | - | |
| >>>>Slice Support List | M | | Slice Support List 9.3.1.17 | Supported S-NSSAIs per TA | - | |
| >>TA Type | O | | ENUMERATED(NTN, NTN with moving cells, ...) | Indicates the type of TA supported. This IE may need to be refined | YES | reject |
| Default Paging DRX | O | | INTEGER (0..63) | | YES | ignore |

| Range bound | Explanation |
|---|---|
| maxnoofTACs | Maximum no. of TACs. Value is 256. |
| maxnoofBPLMNs | Maximum no. of Broadcast PLMNs. Value is 12. |

FIGURE 4

9.2.3.20 TAI Support List

This IE indicates the list of TAIs supported by NG-RAN node and associated characteristics e.g. supported slices.

| IE/Group Name | Presence | Range | IE type and reference | Semantics description | Criticality | Assigned Criticality |
|---|---|---|---|---|---|---|
| TAI Support Item | | 1..<maxnoofsupportedTACs> | | | – | |
| >TAC | M | | 9.2.2.5 | Broadcast TAC | – | |
| >Broadcast PLMNs | | 1..<maxnoofsupportedPLMNs> | | | – | |
| >>PLMN Identity | M | | 9.2.2.4 | Broadcast PLMN | – | |
| >>TAI Slice Support List | O | | Slice Support List 9.2.3.22 | Supported S-NSSAIs per TA | | |
| >TA Type | O | | ENUMERATED(NTN, NTN with moving cells, ...) | Indicates the type of TA supported | YES | Reject |

| Range bound | Explanation |
|---|---|
| maxnoofsupportedTACs | Maximum no. of TACs supported by an NG-RAN node. Value is 1024. This IE may need to be refined. |
| maxnoofsupportedPLMNs | Maximum no. of PLMNs supported by an NG-RAN node. Value is 16. This IE may need to be refined. |

FIGURE 5

METHODS FOR TRACKING AREA MANAGEMENT FOR MOVING RAN

PRIORITY

This nonprovisional application is a U.S. National Stage Filing under 35 U.S.C. § 371 of International Patent Application Serial No. PCT/SE2019/051009 filed Oct. 14, 2019 and entitled "Methods for Tracking Area Management for Moving RAN" which claims priority to U.S. Provisional Patent Application No. 62/754,429 filed Nov. 1, 2018 both of which are hereby incorporated by reference in their entirety.

TECHNICAL FIELD

The present disclosure relates, in general, to wireless communications and, more particularly, systems and methods for tracking area management for moving radio access network (RAN).

BACKGROUND

There is an ongoing resurgence of satellite communications. Several plans for satellite networks have been announced in the past few years. The target services vary, from backhaul and fixed wireless, to transportation, to outdoor mobile, to IoT. Satellite networks could complement mobile networks on the ground by providing connectivity to underserved areas and multicast/broadcast services.

To benefit from the strong mobile ecosystem and economy of scale, adapting the terrestrial wireless access technologies including LTE and NR for satellite networks is drawing significant interest. For example, 3GPP completed an initial study in Release 15 on adapting NR to support non-terrestrial networks (mainly satellite networks). (See, TR 38.811, Study on New Radio (NR) to support non-terrestrial networks.) This initial study focused on the channel model for the non-terrestrial networks, defining deployment scenarios, and identifying the key potential impacts. 3GPP is conducting a follow-up study item in Release 16 on solutions evaluation for NR to support non-terrestrial networks. (See, RP-181370, Study on solutions evaluation for NR to support non-terrestrial networks.)

A satellite radio access network usually includes the following components:
  Gateway that connects satellite network to core network
  Satellite that refers to a space-borne platform
  Terminal that refers to user equipment
  Feeder link that refers to the link between a gateway and a satellite
  Service link that refers to the link between a satellite and a terminal The link from gateway to terminal is often called forward link, and the link from terminal to gateway is often called return link. Depending on the functionality of the satellite in the system, we can consider two transponder options:
  Bent pipe transponder: satellite forwards the received signal back to the earth with only amplification and a shift from uplink frequency to downlink frequency.
  Regenerative transponder: satellite includes on-board processing to demodulate and decode the received signal and regenerate the signal before sending it back to the earth.

Depending on the orbit altitude, a satellite may be categorized as low Earth orbit (LEO), medium Earth orbit (MEO), or geostationary (GEO) satellite.
  LEO: typical heights ranging from 250-1,500 km, with orbital periods ranging from 90-130 minutes.
  MEO: typical heights ranging from 5,000-25,000 km, with orbital periods ranging from 2-14 hours.
  GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 illustrates an example architecture of a satellite network with bent pipe transponders.

In RAN #80, a new SI "Solutions for NR to support Non Terrestrial Network" was agreed. It is a continuation of a preceding SI "NR to support Non-Terrestrial Networks" (RP-171450), where the objective was to study the channel model for the non-terrestrial networks, to define deployment scenarios and parameters, and to identify the key potential impacts on NR. The results are reflected in TR38.811.

The objectives of the current SI are to evaluate solutions for the identified key impacts from the preceding SI and to study impact on RAN protocols/architecture. The objectives are:
  Physical Layer
    Consolidation of potential impacts as initially identified in TR 38.811
    and identification of related solutions if needed [RAN1]:
      Physical layer control procedures (e.g. CSI feedback, power control)
      Uplink Timing advance/RACH procedure including PRACH sequence/format/message
      Making retransmission mechanisms at the physical layer more delay-tolerant as appropriate. This may also include capability to deactivate the HARQ mechanisms.
    Performance assessment of NR in selected deployment scenarios (LEO based satellite access, GEO based satellite access) through link level (Radio link) and system level (cell) simulations [RAN1]
  Layer 2 and Above, and RAN Architecture
    Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]
    Handover: Study and identify mobility requirements and necessary measurements that may be needed for handovers between some non-terrestrial space-borne vehicles (such as Non Geo stationary satellites) that move at much higher speed but over predictable paths [RAN2, RAN1]
    Architecture: Identify needs for the 5G's Radio Access Network architecture to support non-terrestrial networks (e.g. handling of network identities) [RAN3]
      Paging: procedure adaptations in case of moving satellite foot prints or cells
  Note: This new study item does not address regulatory issues.

The coverage pattern of NTN is described in TR 38.811 in Section 4.6 as follows:
Satellite or aerial vehicles typically generate several beams over a given area. The foot print of the beams are typically elliptic shape.
The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

TABLE 4.6-1

| Typical beam footprint size | | | |
|---|---|---|---|
| Attributes | GEO | Non-GEO | Aerial |
| Beam foot print size in diameter | 200-1000 km | 100-500 km | 5-200 km |

FIG. 2 illustrates typical beam patterns of various NTN access networks. The TR of the ongoing SI, TR 38.821, describes scenarios for the NTN work as follows:
Non-Terrestrial Network typically Features the Following Elements:
One or several sat-gateways that connect the Non-Terrestrial Network to a public data network
a GEO satellite is fed by one or several sat-gateways which are deployed across the satellite targeted coverage (e.g. regional or even continental coverage). We assume that UE in a cell are served by only one sat-gateway
A Non-GEO satellite served successively by one sat-gateway at a time. The system ensures service and feeder link continuity between the successive serving sat-gateways with sufficient time duration to proceed with mobility anchoring and hand-over
(See, TR 38.821, Study on solutions evaluation for NR to support non-terrestrial networks).

Four scenarios are considered as depicted in Table 4.2-1 and are detailed in Table 4.2-2.

TABLE 4.2-1

| Reference scenarios | | |
|---|---|---|
| | Transparent satellite | Regenerative satellite |
| GEO based non-terrestrial access network | Scenario A | Scenario B |
| LEO based non-terrestrial access network | Scenario C | Scenario D |

TABLE 4.2-2

| Reference scenario parameters | | |
|---|---|---|
| Scenarios | GEO based non-terrestrial access network (Scenario A and B) | LEO based non-terrestrial access network (Scenario C & D) |
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e g. 2 GHz)<br>>6 GHz (e g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |

TABLE 4.2-2-continued

| Reference scenario parameters | | |
|---|---|---|
| Max Round Trip Delay (propagation delay only) | Scenario A: 562 ms (service and feeder links) Scenario B: 281 ms | Scenario C: 25.76 ms (transparent payload: service and feeder links) Scenario D: 12.88 ms (regenerative payload: service link only) |
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train) Possibly 1000 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3 GPP or non-3GPP defined Radio interface |

Each satellite has the capability to steer beams towards fixed points on earth using beamforming techniques. This is applicable for a period of time corresponding to the visibility time of the satellite.

Max delay variation within a beam (earth fixed user equipment) is calculated based on Min Elevation angle for both gateway and user equipment.

Max differential delay within a beam is calculated based on Max beam foot print diameter at nadir.

For scenario D, which is LEO with regenerative payload, both earth-fixed and earth moving beams have been listed. So, when we factor in the fixed/non-fixed beams, we have an additional scenario. The complete list of 5 scenarios in TR 38.821 is then:

Scenario A—GEO, transparent satellite, Earth-fixed beams;
Scenario B—GEO, regenerative satellite, Earth fixed beams;
Scenario C—LEO, transparent satellite, Earth-moving beams;
Scenario D1—LEO, regenerative satellite, Earth-fixed beams;
Scenario D2—LEO, regenerative satellite, Earth-moving beams.

When NR or LTE is applied to provide the connectivity via satellites, it means that the ground station is a RAN node. In the case where the satellite is transparent, all RAN functionalities are on the ground which means the sat-gateway has whole eNB/gNB functionality. For the regenerative satellite payload, part or all, of the eNB/gNB processing may be on the satellite.

There are mobility issues for UEs served by non-geo satellites. For example, non-Geo satellites move rapidly with respect to any given UE location. As an example, on a 2-hour orbit, a LEO satellite is in view of a stationary UE from horizon to horizon for about 20 minutes. Since each LEO satellite may have many beams, the time during which a UE stays within a beam is typically only a few minutes. The fast pace of satellite movement creates problems for mobile terminated reachability (i.e. paging), mobile originated reachability (i.e., random access) as well as idle and connected mode mobility (i.e., handovers) for a stationary UE as well as a moving UE.

Unlike terrestrial framework where a cell on the ground is tied to radio communication with a RAN, in non-GEO satellite access network, the satellite beams may be moving. There is no fixed correspondence between cells on the ground and satellite beams. The same geographical region on the ground can be covered by different satellites and different beams over time.

Basically, when one LEO satellite's beam moves away from the geographical area, another LEO satellite's beam (that may be generated by the same LEO satellite or by a neighboring LEO satellite) should come in and cover the same geographical area.

Further, the ground serving RAN node changes when the sat-gateway changes. This situation is not present in normal terrestrial networks.

Network identities as described in 38.300:
NR Cell Global Identifier (NCGI): used to identify NR cells globally. The NCGI is constructed from the PLMN identity the cell belongs to and the NR Cell Identity (NCI) of the cell.
gNB Identifier (gNB ID): used to identify gNBs within a PLMN. The gNB ID is contained within the NCI of its cells.
Global gNB ID: used to identify gNBs globally. The Global gNB ID is constructed from the PLMN identity the gNB belongs to and the gNB ID. The MCC and MNC are the same as included in the NCGI.
Tracking Area identity (TAI): used to identify tracking areas. The TAI is constructed from the PLMN identity the tracking area belongs to and the TAC (Tracking Area Code) of the Tracking Area.

For example, TAI and NR cell identity are given in SIB 1 for UE in connected and idle mode to know which tracking area they are currently connected to, or should be paged from.

Certain problems exist, however. For example, in non-GEO scenarios, the beams can be fixed on ground of sweeping earth. Both of these scenario types have different assumption as when combined with LTE/NR, it results that the reference signals, where PSS/SSS represent the PCI, also stay fixed or sweeps the ground.

The moving RAN means also that the sat-gateway, which is the ground station for the satellite, switches as the satellite moves. This will happen time to time for both earth fixed beam and earth moving beam non-GEO scenarios. FIG. 3 illustrates gateway switching. Specifically, FIG. 3 illustrates the satellite switches from gateway 1 to gateway 2.

A non-GEO satellite is served successively by one sat-gateway at a time. When the sat-gateway switches, the ground RAN node which may carry the gNB also switches. The question is what happens to the network identities UE sees.

On the service link between UE and satellite, there are reference signals transmitted. The NR-PSS/SSS, reference signals send represent the PCI, physical cell ID. When the feeder sat-gateway switches, the PCI send via the satellite can be kept the same or there can be service break and reference signals related to another PCI are sent. Further, there is issue how to handle cell ID and PLMN ID mapping.

Though these problems and solutions are described herein using NR terminology, the similar problems may apply to LTE as well where applicable.

SUMMARY

Certain aspects of the present disclosure and their embodiments may provide solutions to these or other challenges. For example, according to certain embodiments, solutions are disclosed for handling different network identities and tracking area management for this non-GEO case.

According to certain embodiments, a method includes serving a cell area by a first physical network node for a first time duration. The first physical network node uses an identifier of a logical network node. For a second time duration, the cell area is served by a second physical network node. The second physical network node uses the identifier of the logical network node. The first physical network node serves the cell area with a first frequency band and the second physical network node serves the cell area with a second frequency band.

According to certain embodiments, a method performed by a network node includes determining a plurality of cells that will be covering a geographical location based on satellite orbit information. Each cell covers the geographical location for a respective one of a plurality of durations of time. Each of the plurality of cells are associated with a respective one of a plurality of satellites. A list of at least one tracking area identifier (TAI) are generated for each of the plurality of satellites covering the cell. Based on the list of at least one TAI, it is determined at a first point in time a particular one of the satellites that is currently serving the wireless device. A RAN configuration message is transmitted to an Access Mobility Function (AMF), notifying the AMF about the particular one of the satellites that is currently serving the wireless device. Each TAI is selected from a range of TAs associated with a moving cell, and the TAI identifies a type of TA supported.

According to certain embodiments, a network node includes processing circuitry configured to serve a cell area by a first physical network node for a first time duration. The first physical network node use an identifier of a logical network node. For a second time duration, the cell area is served by a second physical network node. The second physical network node uses the identifier of the logical network node. The first physical network node serves the cell area with a first frequency band, and the second physical network node serves the cell area with a second frequency band.

According to certain embodiments, a network node includes processing circuitry configured to determine a plurality of cells that will be covering a geographical location based on satellite orbit information. Each cell covers the geographical location for a respective one of a plurality of durations of time. Each of the plurality of cells are associated with a respective one of a plurality of satellites. The processing circuitry is configured to generate a list of at least one TAI for each of the plurality of satellites covering the cell. Based on the list of at least one TAI, the processing circuitry is configured to determine at a first point in time a particular one of the satellites that is currently serving the wireless device. A RAN configuration message is transmitted to an AMF, notifying the AMF about the particular one of the satellites that is currently serving the wireless device. Each TAI is selected from a range of TAs associated with a moving cell, and the TAI identifies a type of TA supported. Certain embodiments may provide one or more of the following technical advantages. For example, one technical advantage may be that certain embodiments introduce systems and methods for supporting smoother switch of sat-gateways.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 4 illustrates a modified table with the appropriate extension to the RAN CONFIGURATION UPDATE message for NGAP, according to certain embodiments;

FIG. 5 illustrates a table with a similar extension introduced for XnAP in the TAI Support List IE, signaled in the NG-RAN NODE CONFIGURATION UPDATE message, according to certain embodiments;

DETAILED DESCRIPTION

Figure 1:
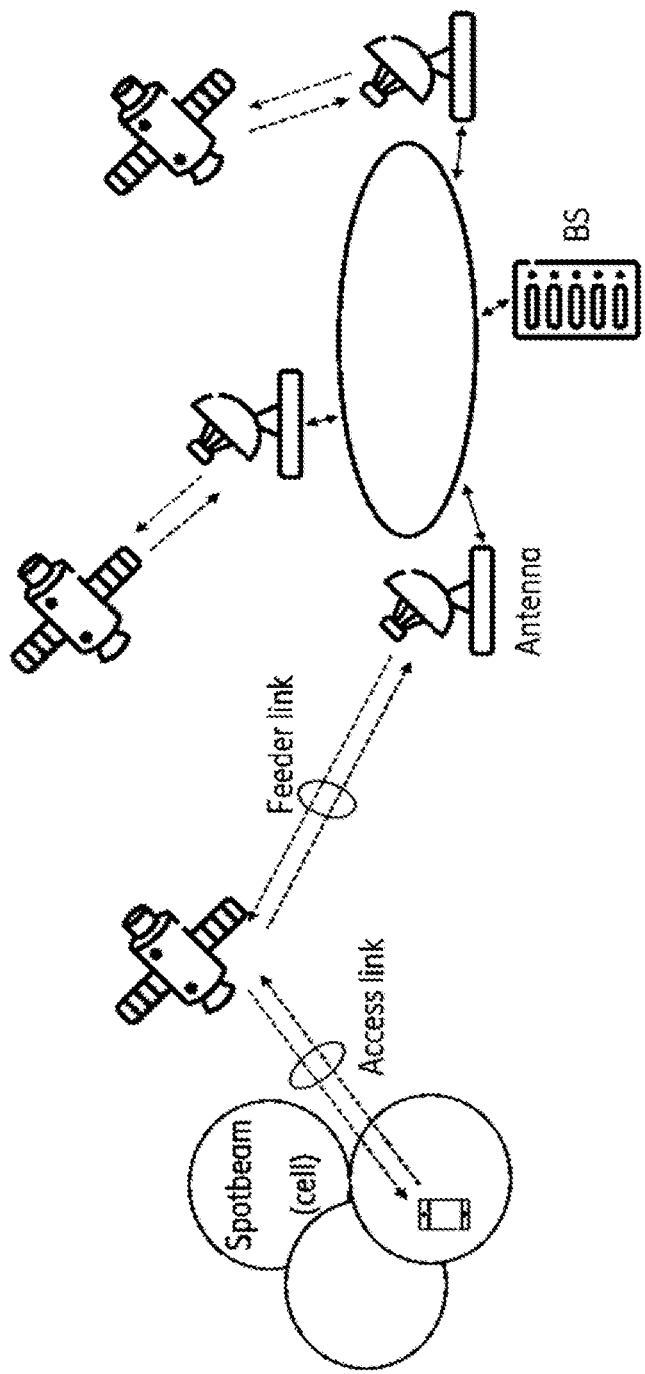
FIG. 1 illustrates an example architecture of a satellite network with bent pipe transponders.
Figure 2:
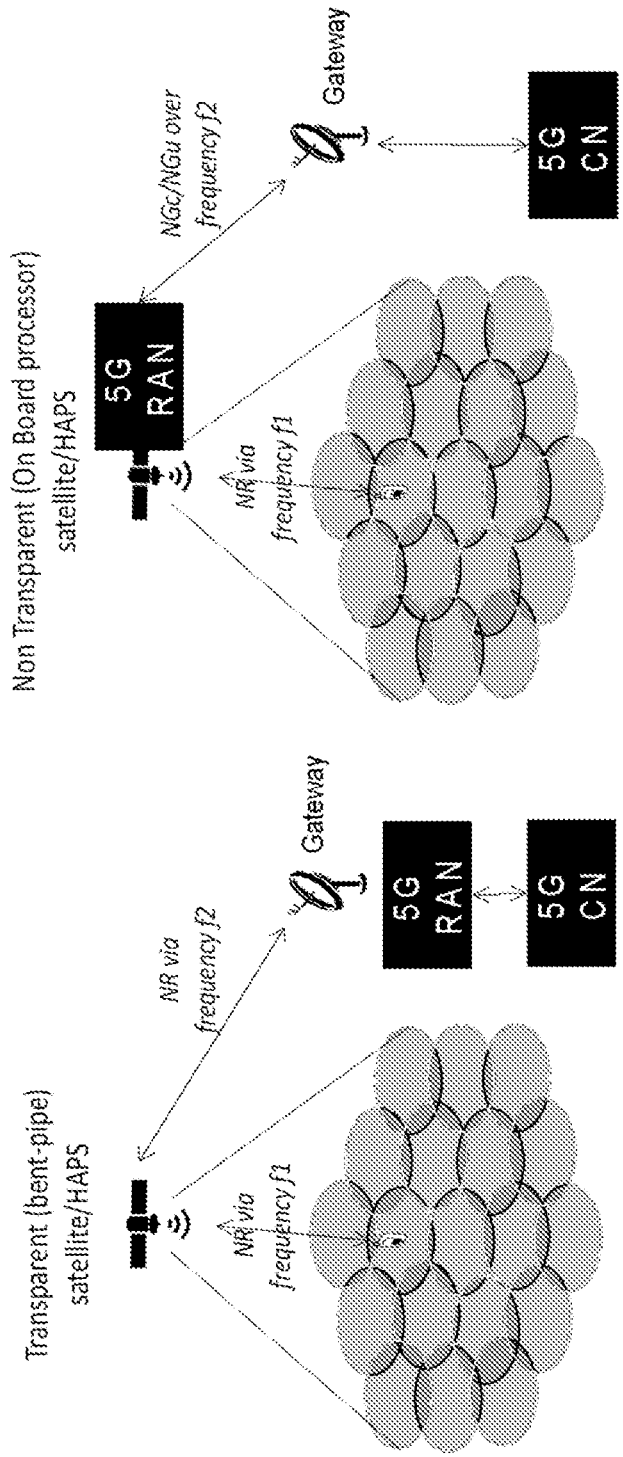
FIG. 2 illustrates typical beam patterns of various NTN access networks.
Figure 3:
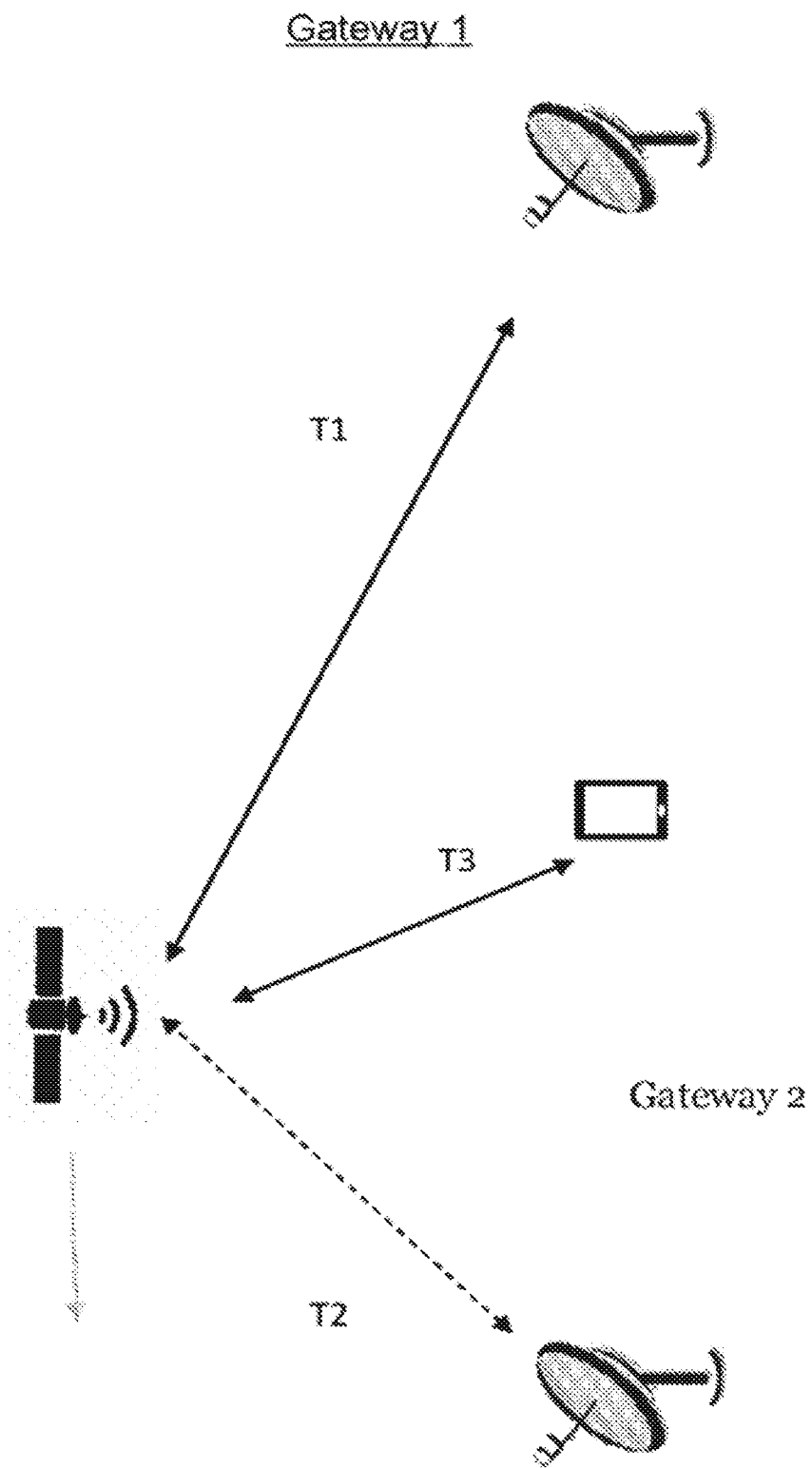
FIG. 3 illustrates gateway switching.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

The solutions described herein include methods related to tracking area update related non-GEO scenarios with earth fixed and earth moving beams while feeder link connection stays fixed. Further, the solutions also apply to the case of a switch of ground sat-gateways. The grouping of embodiments under these subtitles is indicative. It may be that one embodiment applies to also other cases. Though the solutions are described herein using NR terminology, similar solutions may apply to LTE as well where applicable.

In all embodiments the solution is described using the definition of tracking area (TA), but the ideas apply to tracking UE using RAN area as well.

Certain non-GEO scenarios may include the earth fixed beams and earth moving beams while a feeder link connection stays fixed. For example, according to a first embodiment, logical gNB ID may be used for UE tracking in NTN with earth fixed beams. Specifically, according to certain embodiments, for earth fixed beam (regardless of transparent or regenerative satellite) where spotbeams point to fixed geographical areas for as long as it can when the satellite moves, a logical gNB is assigned to serve a fixed geographical area. Due to satellite movement, the physical gNB serving the area may change. Network makes sure the correct use of logical gNB for the corresponding area when satellite/sat-gateway changes. Specifically, for a first time duration, the area is served by a first physical gNB. In this time duration, the first physical gNB uses the ID of the logical gNB for serving this area. For a second time duration following the first time duration, the area is served by a second physical gNB. In this time duration, the second physical gNB uses the ID of the logical gNB for serving this area. And so forth.

In other words, for a fixed geographical area, the cell ID is fixed though the physical serving gNB/sat-gateway may change. With the use of logical gNB, UE tracking area management can be done in a way similar to terrestrial networks. NW makes sure the correct use of logical gNB when satellite/sat-gateway changes, which can be made transparent to the UE. This constant update of logical gNB ID at the network may be easier for NW to handle compared to the connection disruption due to change of physical serving gNB/sat-gateway and the load of reestablishment of all the disrupted connections after the transition.

The logical gNB can also be understood as TAI which consists of PLMN and tracking area code. In this sense, when new physical gNB starts to cover the same area as the old physical gBN, even if there would need to happen a handover from old to new (source to target) physical gNB sending reference signals via different physical satellite, the logical gNB, that is the TAI in this case, is preserved. These physical gNBs may serve the same area with same of different frequency band, or with partly overlapping frequency band.

According to another embodiment providing IDLE mode UE support, the physical gNB(PgNB) that is soon stopping serving the area stops paging UEs and paging happens via pgNB that has just started to serve the area. The old pGB may broadcast an indication that it has stopped paging and that there should not happen RACH to this pGNB. It may also broadcast information on frequency location, SS/PBCH Block Measurement Time Configuration (SMTC), Physical Layer Cell Identifier (PCI) or other information on new pGNB.

According to a second embodiment, TAI lists may be updated based on predicting satellite movements. For NTN with moving beams (regardless of transparent or reenerative) where spotbeams move with the satellite, cells are moving as well. A TA code may be used to identify one or more cells. Since TA code is tied to cell ID's, the change of TA code depends on the change of Cell ID. As satellites (and cells) move, the UE may switch from being served by one cell (with one TAC) to another cell (with another TAC). Given the satellite orbit and cell/spotbeam changing pattern, the change of cells is predictable and can be pre-calculated for a given location on the ground.

Currently AMF generates TAI list for each UE based on information known about the UE, e.g. UE location, mobility patterns etc. AMF could also be configured with satellite orbit information and thus know what cells will covering a certain location at a certain time. The AMF can thus update the TAI List in the UE based on information about the latest TAI where UE was located and predicting what TAIs will be covering that same location in near future. A proactive updating of the TAI List in UE could be done via UE configuration update procedure.

According to a third embodiment, a list of TAI may be used with time stamps for UE tracking in NTN with moving beams. For NTN with moving beams (regardless of transparent or regenerative) where spotbeams move with the satellite, cells are moving as well. A TA code may be used to identify one or more cells. Since TA code is tied to cell ID's, the change of TA code depends on the change of Cell ID. Given the satellite orbit and cell/spotbeam changing pattern, the change of cells is predictable and can be pre-calculated for a given location on the ground. A list of TAI lists with time stamps can be used for UE tracking area management.

Specifically, a UE may obtain an initial list of TAI lists when it attaches to the network. The list of TAI lists can be computed by the network, or the UE, or a combination of both, based on UE location, satellite orbit, cell/spotbeam pattern, etc. Each TAI list corresponds to a list of tracking areas configured to the UE. Each TAI list i is associated with a time stamp $t_i$. For time $t_i$ to time $t_{i+1}$, TAI list i is valid. This list i gives the tracking areas where the network believes a UE is located and within which a UE can travel without TA update during the time $t_i$ to time $t_{i+1}$. During time $t_i$ to time $t_{i+1}$, UE has to send TA update to the network when it moves to a new TA other than the ones listed in the TAI list i. Then an updated/new list of TAI lists can be set up reflecting the UE's move (such as new position, speed, etc) for tracking the UE.

According to a fourth embodiment, an assumption may be that TAC is fixed on earth. Satellite network may be assigned with a PLMN code that is country agnostic similar to what is assigned to aircraft etc. Then, TAI is this PLMN+the earth fixed TAC. As the beams sweep the earth, while over certain region, a certain TAI is broadcasted. While transiting from one area to another area, two or more TAIs are broadcasted. UE actions can be similar or same as in current NR networks. To e.g. ensure that the CN paging procedure is properly handled, the network would need to maintain a mapping between RAN TAI, which means which gNB is serving currently which TAI geographical area. This could be done by gNB sending a N2 RAN configuration update message to AMF, notifying AMF about the TAIs currently served by the gNB.

According to a fifth embodiment, keeping TAs fixed is desirable from the point of view of the Core Network (it simplifies handling of paging procedures). For the case of LEO regenerative satellite with moving satellite beams, this implies that the cell identifiers are tied to the TA. The satellite cells themselves can then be either stationary with respect to the ground, in which case the association between satellite beams and cell identifiers is constantly modified, or moving with respect to the ground (while still maintaining the association with the same TA).

The first case would imply a constant reconfiguration of the satellite beams in order to always cover the same ground region. Such reconfiguration would be "hidden" from all network interfaces, and all the burden would be on the NTN gNB implementation.

In the second case, the fact that there is a TA associated to moving cells could pose issues with respect to the core network and to any terrestrial gNBs running Xn interfaces to the NTN gNB. Such TA needs to be differentiated with respect to all other TAs. One way to do this is to set aside a range of identifier(s) for TAs associated with NTN moving cells. This restricts the possible TA address space (TA Codes are currently encoded as 3 octets), and may not be compatible with the operator's planning. A better alternative is to extend the TAC IE signaled over NGAP and XnAP with a "NTN TAC identifier IE" defined as ENUMERATED (NTN, . . . ) so that the receiving node can identify that the cells associated with this TA are related to a NTN, and/or are not stationary with respect to the ground.

FIG. 4 illustrates a modified table 50 with the appropriate extension, shown in underline, to the RAN CONFIGURATION UPDATE message for NGAP, as provided in 3GPP TS 38.413 Rel-15. According to the Specification, the RAN CONFIGURATION UPDATE message is sent by the NG-RAN node to transfer updated application layer information for an NG-C interface instance.

FIG. 5 illustrates a table 75 with a similar extension introduced for XnAP in the TAI Support List IE, signaled in the NG-RAN NODE CONFIGURATION UPDATE message, as discussed in 3GPP TS 38.423 Rel-15.

Certain general example embodiments may be applied to GEO as well. For example, according to certain embodiments, assuming regenerative satellite with gNB functionality, no identities may be fixed to the ground but may be fixed to the satellite. With UE position known, the UE can be informed with a list of satellites with trajectories and beam directions that will cover the UEs position. As long as the UE stays within the beams transmitted from the satellites, no TAU is needed when service links are switched. Feeder link switching will then be transparent to the UE.

As another example, in certain related embodiments, with known UE position, the UE may get a location area describing where the NTN will page the UE. The UE should update its location when moving out of this area. The location area size is a tradeoff between efficient paging and location updates from the UE. This update can be done in RRC IDLE, RRC_INACTIVE and in RRC_CONNECTED.

Certain other non-GEO Scenarios may include the earth fixed and earth Moving beams in case of a switch of ground sat-gateways. For example, according to an embodiment, it may be assumed ground nodes keep Global and gNB identities and PLMN if fixed on ground. Feasible assumption at least for transparent satellite. When feeder link switches and satellite keeps the PCI of the service link. The system information needs to update the cell identity and PLMN identity it is broadcasting. UE needs to read updated system information. This can be based on preconfigured information on when the feeder link is going to update, or it can be based on RRC signaling where UE is prepared to the switch.

The switch of the ground gateway may also mean UEs need to be dropped and need to reconnect. Providing the UE with the new information on tracking areas can simplify synchronizing to the new cell after feeder-link switch.

For idle mode UEs, the change of system information due to the service link change, can lead to multiple UEs performs a Tracking area Update (TAU) simultaneously due to the new system information. The idle mode UEs could in one embodiment be informed via broadcast, a new tracking area list. Or a new TAI to add to existing list, and/or a TAI to remove from existing UE TA list. This will prevent multiple UEs to perform TAU simultaneously. And in another embodiment, the satellite could broadcast the TAI of the next satellite that is expected to serve the UE.

According to certain embodiments, it may be assumed that ground nodes keep Global and gNB identities and PLMN if fixed on ground. When feeder link switches and satellite changes the PCI of the service link.

According to certain other embodiments, it may be assumed that ground nodes keep PLMN fixed on ground but gNB is on board as is one assumption for regenerative satellite. When feeder link switches and satellite keeps Global and gNB identities as well as PCI of the service link, the system information needs to update the PLMN identity it is broadcasting. UE needs to read updated system information. This can be based on preconfigured information on when the feeder link is going to update, or it can be based on RRC signaling where UE is prepared to the switch.

Figure 6:
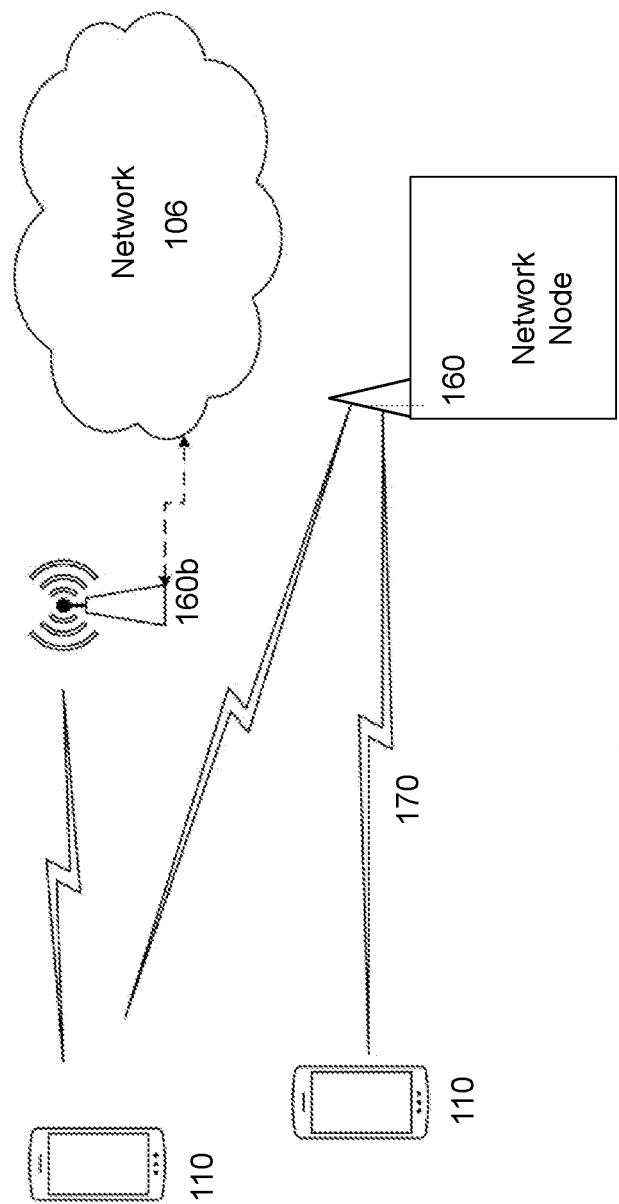
FIG. 6 illustrates an example wireless network, according to certain embodiments.

FIG. 6 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail.

The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
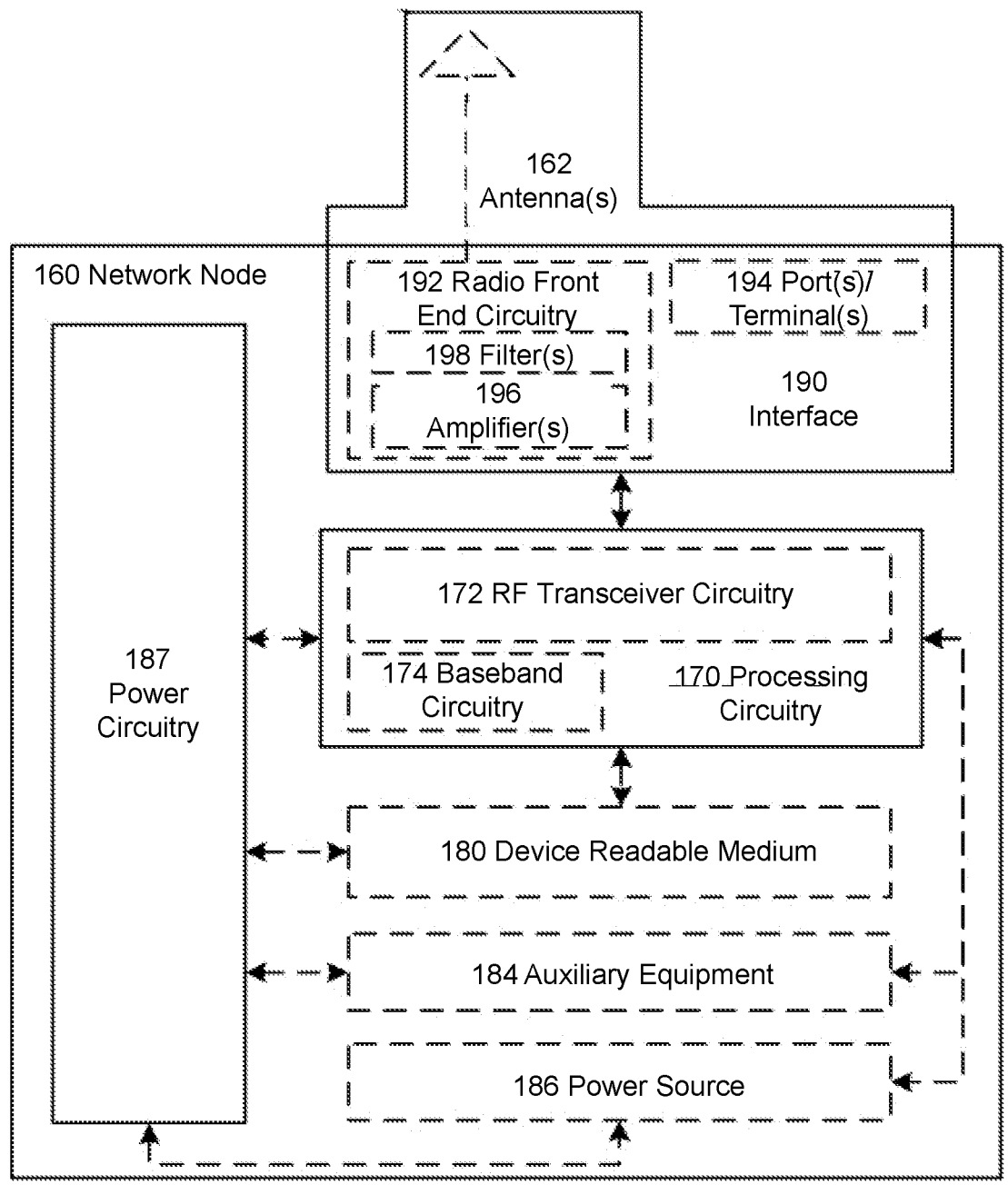
FIG. 7 illustrates an example network node, according to certain embodiments.

FIG. 7 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
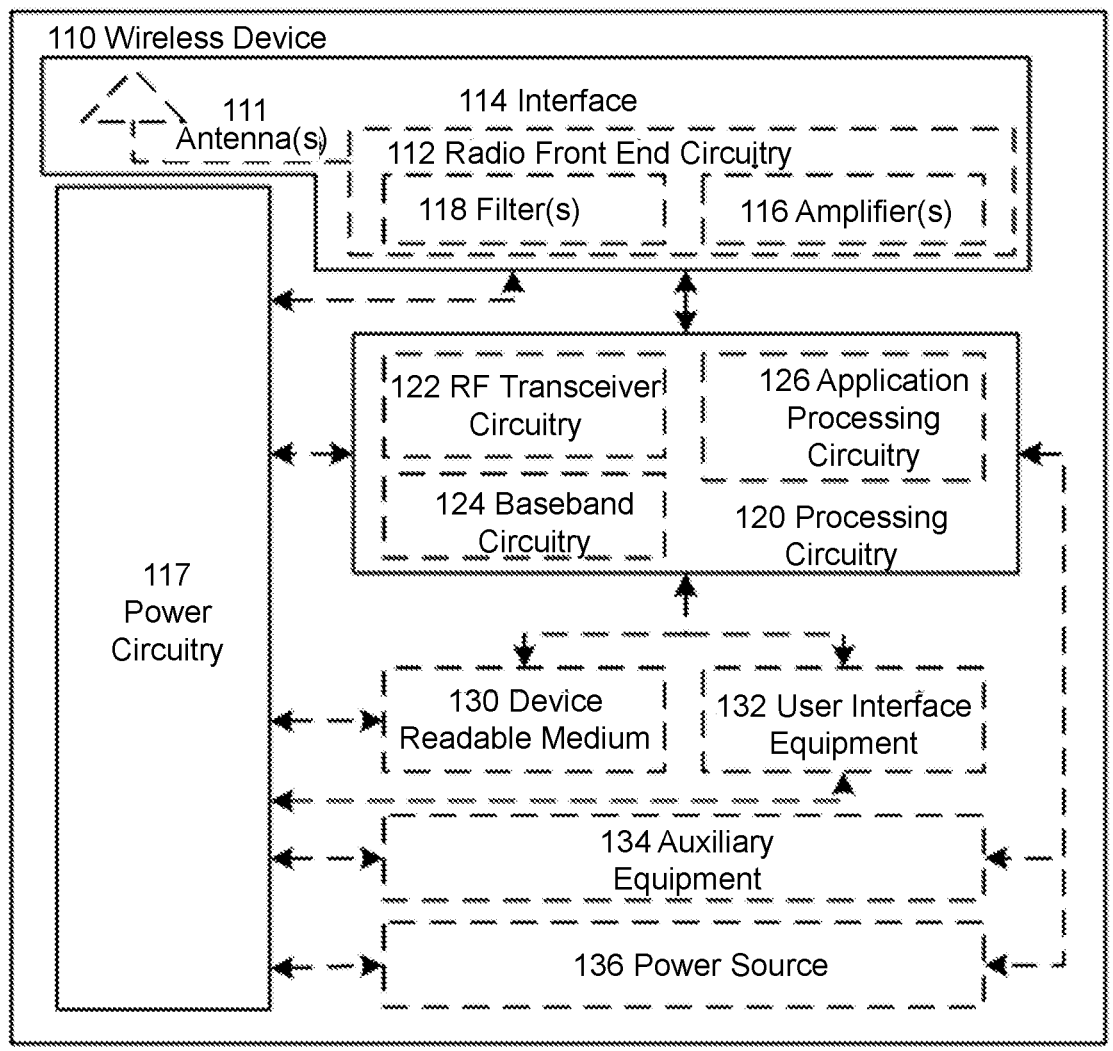
FIG. 8 illustrates an example wireless device, according to certain embodiments.

FIG. 8 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
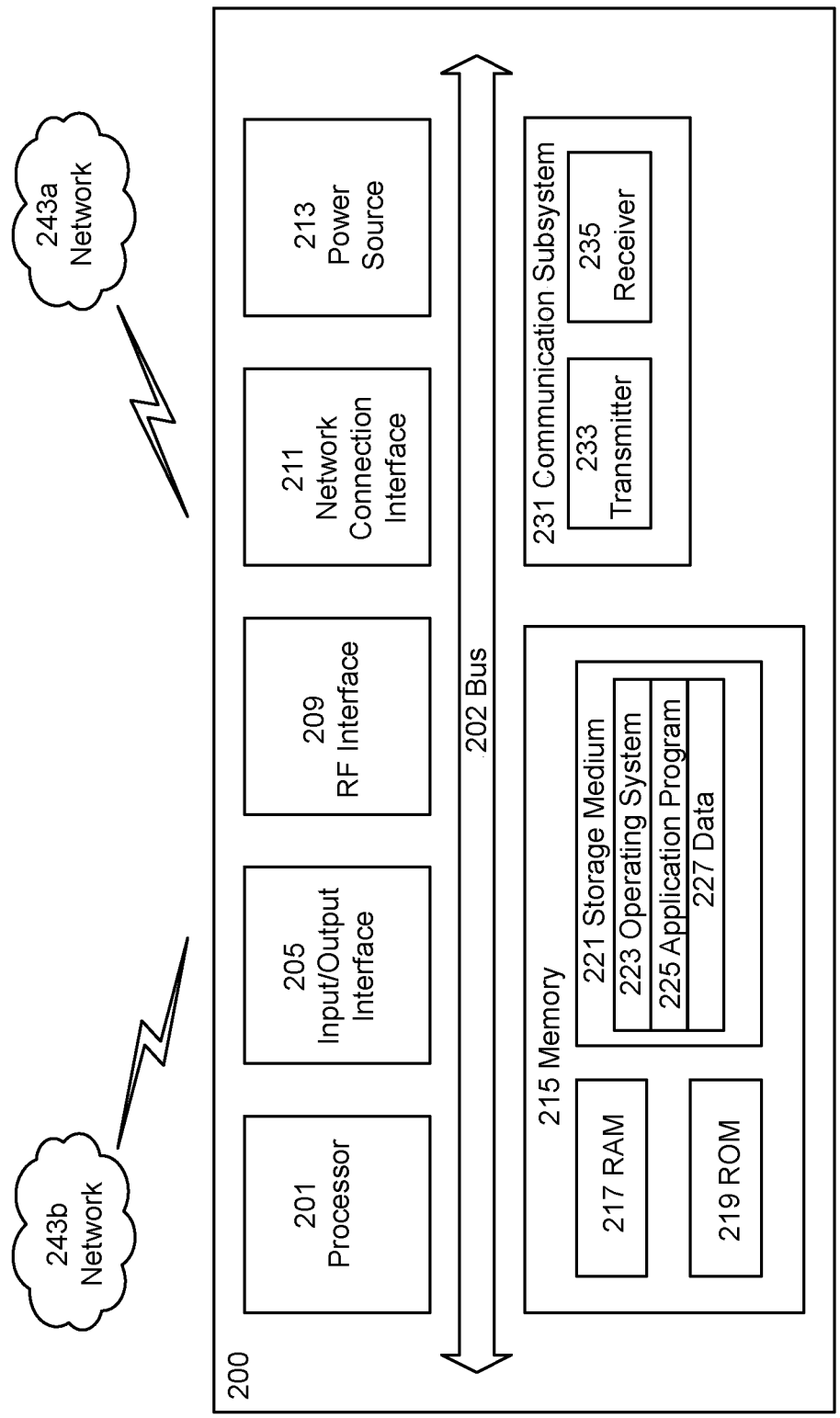
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
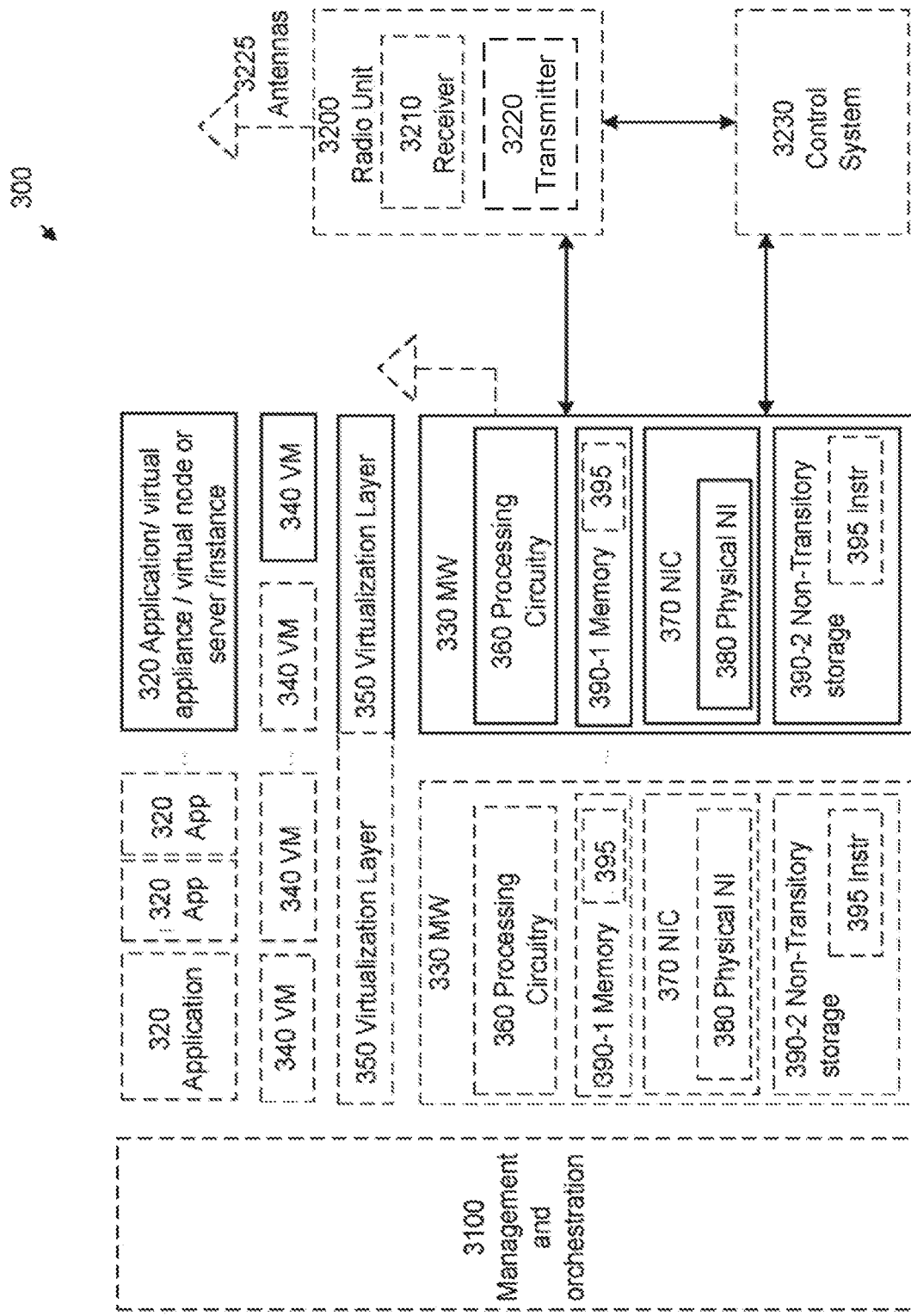
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 11:
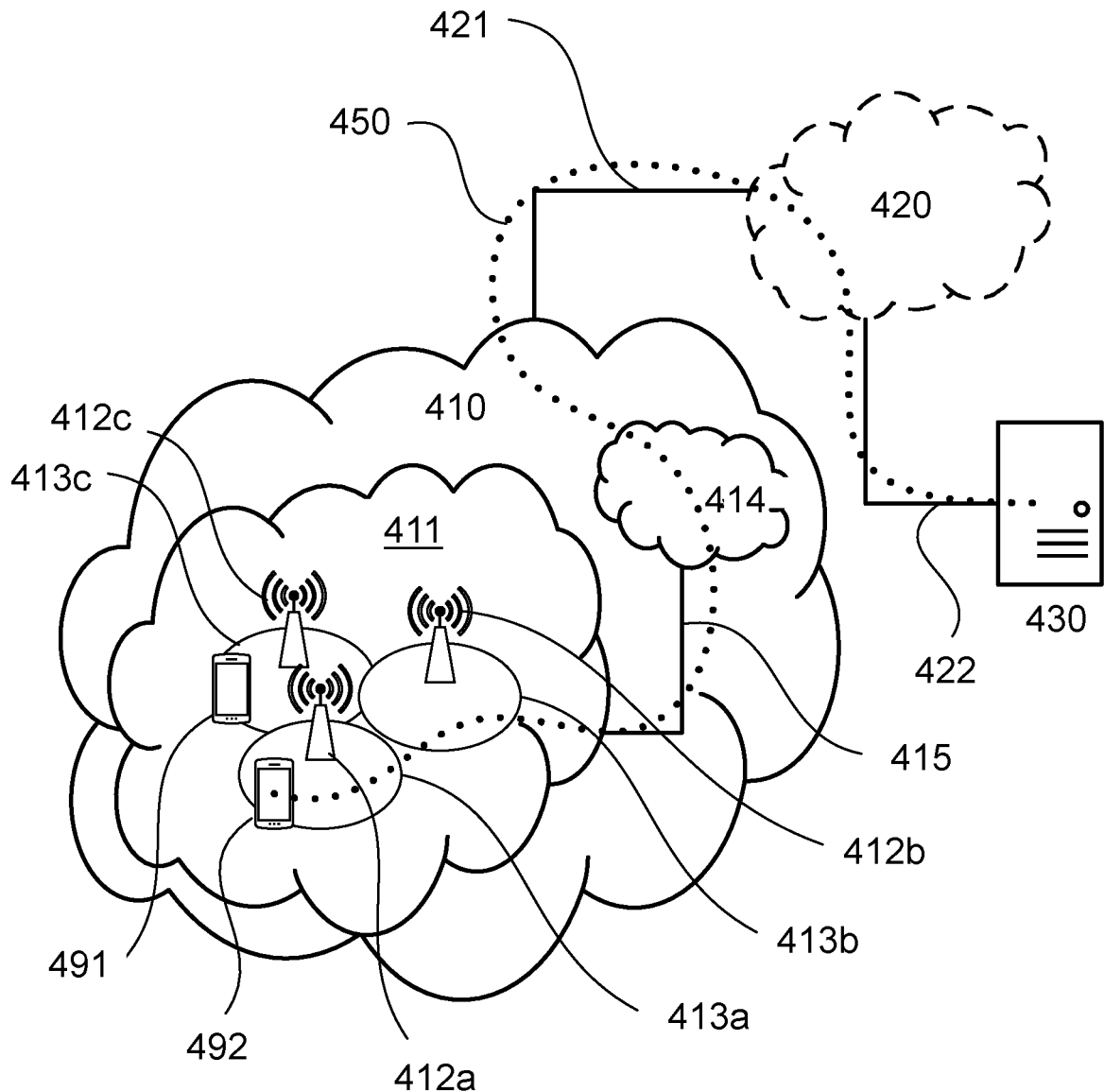
FIG. 11 illustrates a telecommunication network connected via an intermediate network to a host computer, according to certain embodiments.

FIG. 11 illustrates a telecommunication network connected via an intermediate network to a host computer in accordance with some embodiments.

With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 12:
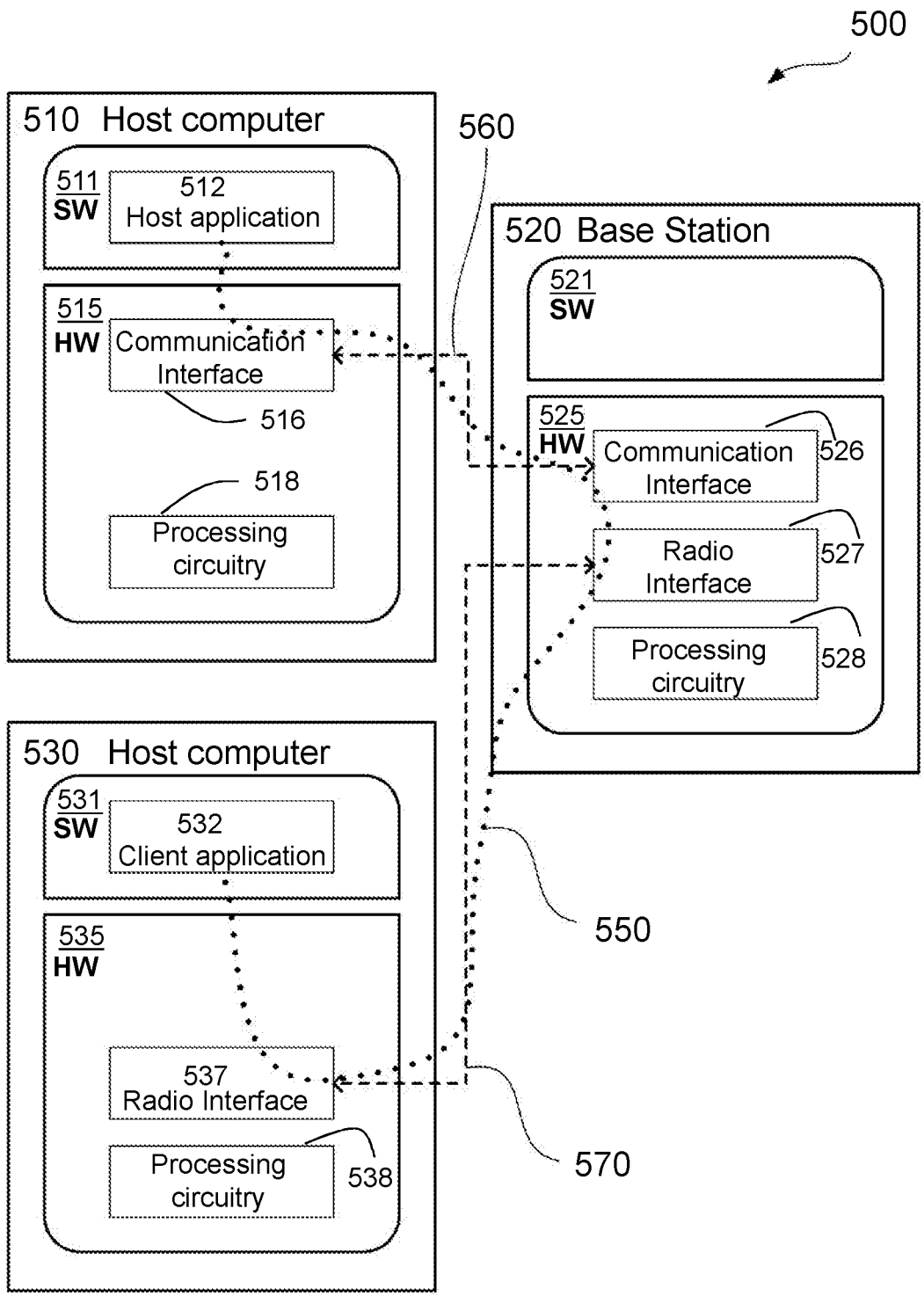
FIG. 12 illustrates a generalized block diagram of a host computer communicating via a base station with a user equipment over a partially wireless connection, according to certain embodiments.

FIG. 12 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
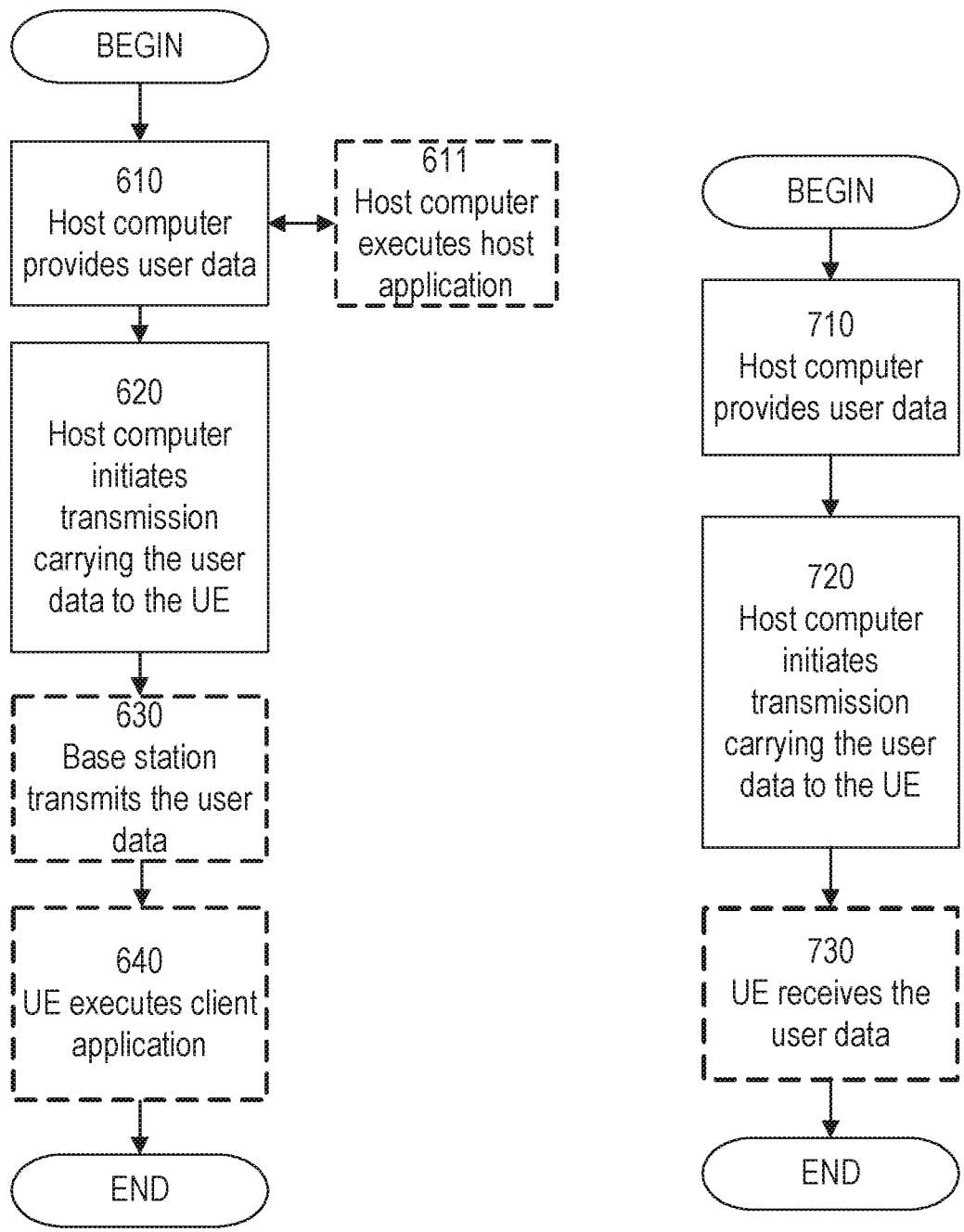
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 15, 16:
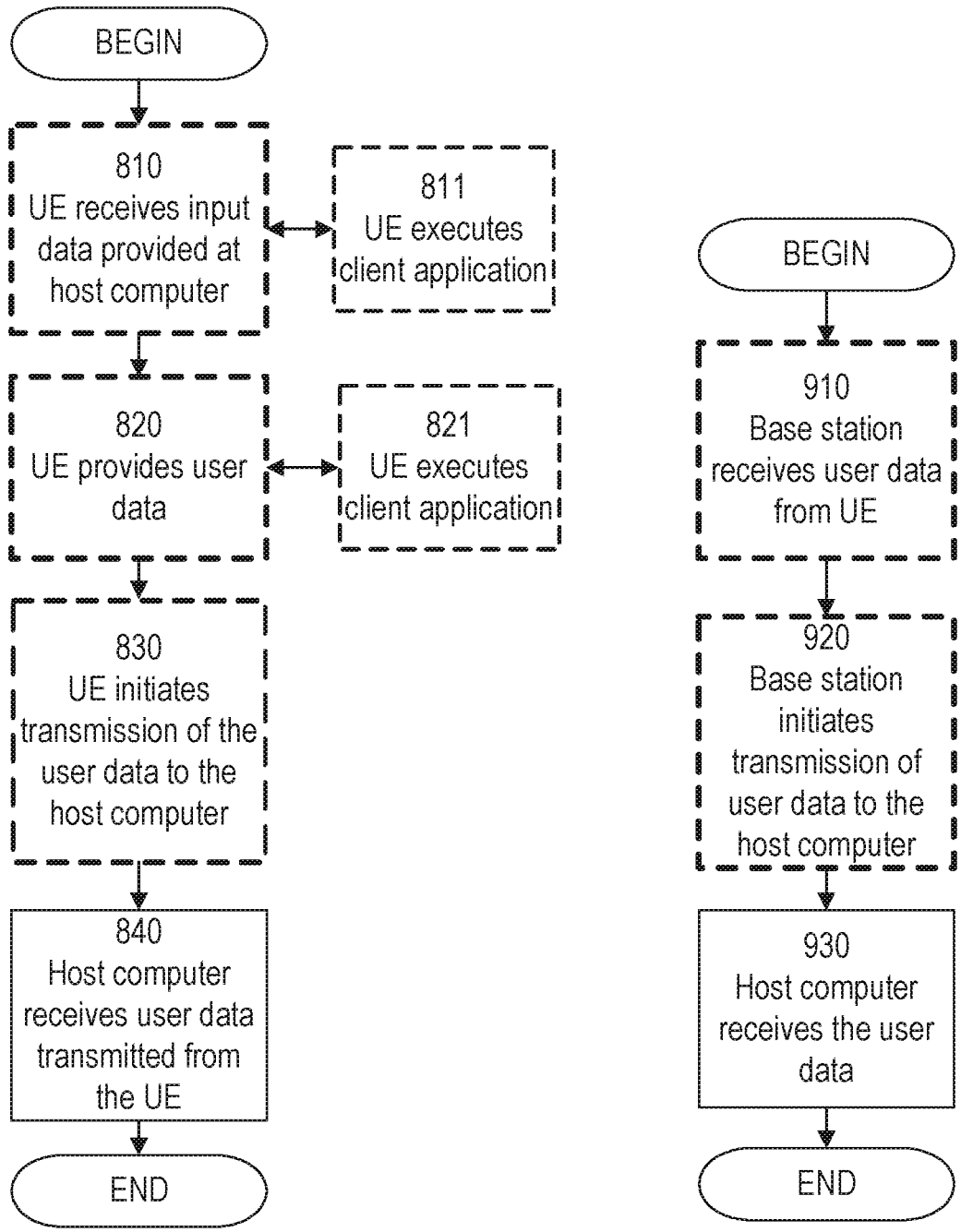
FIG. 15 illustrates another method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 17:
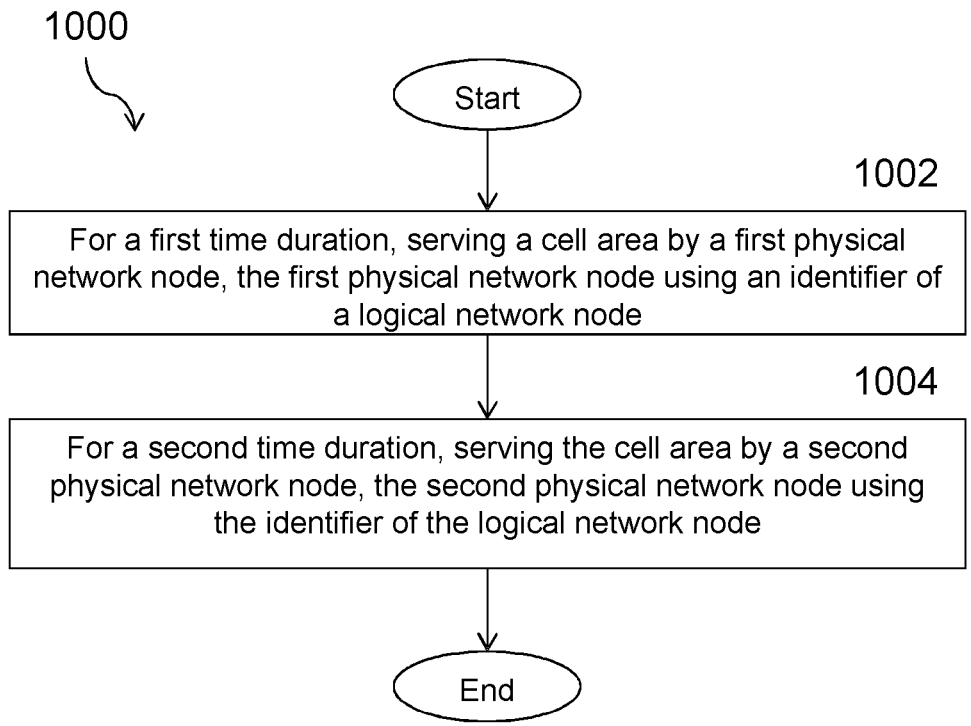
FIG. 17 illustrates an example method by a network node, according to certain embodiments.

FIG. 17 depicts a method 1000, according to certain embodiments. At step 1002, for a first time duration a cell area is served by a first physical network node. The first physical network node uses an identifier of a logical network node. At step 1004, and for a second time duration, the cell area is served by a second physical network node. The second physical network node uses the identifier of the logical network node.

Figure 18:
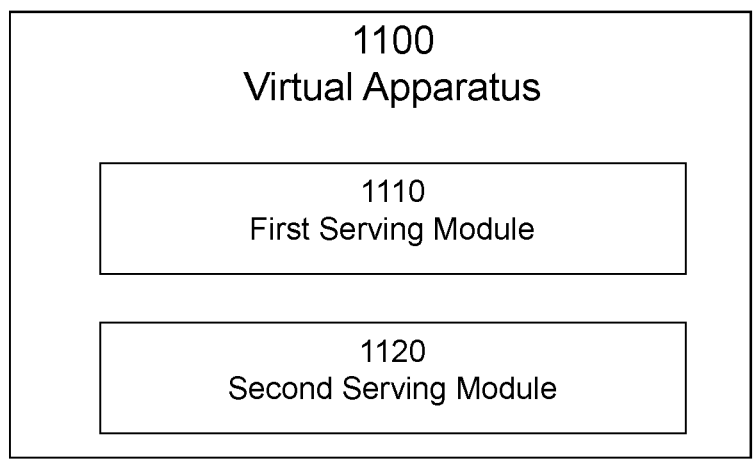
FIG. 18 illustrates an exemplary virtual computing device, according to certain embodiments.

FIG. 18 illustrates a schematic block diagram of a virtual apparatus 1100 in a wireless network (for example, the wireless network shown in FIG. 6). The apparatus may be implemented in a wireless device or network node (e.g., wireless device 110 or network node 160 shown in FIG. 6). Apparatus 1100 is operable to carry out the example method described with reference to FIG. 17 and possibly any other processes or methods disclosed herein. It is also to be understood that the method of FIG. 17 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first serving module 1110, second serving module 1120, and any other suitable units or modules of apparatus 100 to perform corresponding functions according one or more embodiments of the present disclosure.

According to certain embodiments, first serving module 1110 may perform certain of the serving functions of the apparatus 1100. For example, first serving module 1110 may serve, for a first time, a cell area is served by a first physical network node. The first physical network node uses an identifier of a logical network node.

According to certain embodiments, second serving module 1120 may perform certain other of the serving functions of the apparatus 1100. For example, second serving module 1120 may serve, for a second time duration, the cell area by a second physical network node. The second physical network node uses the identifier of the logical network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
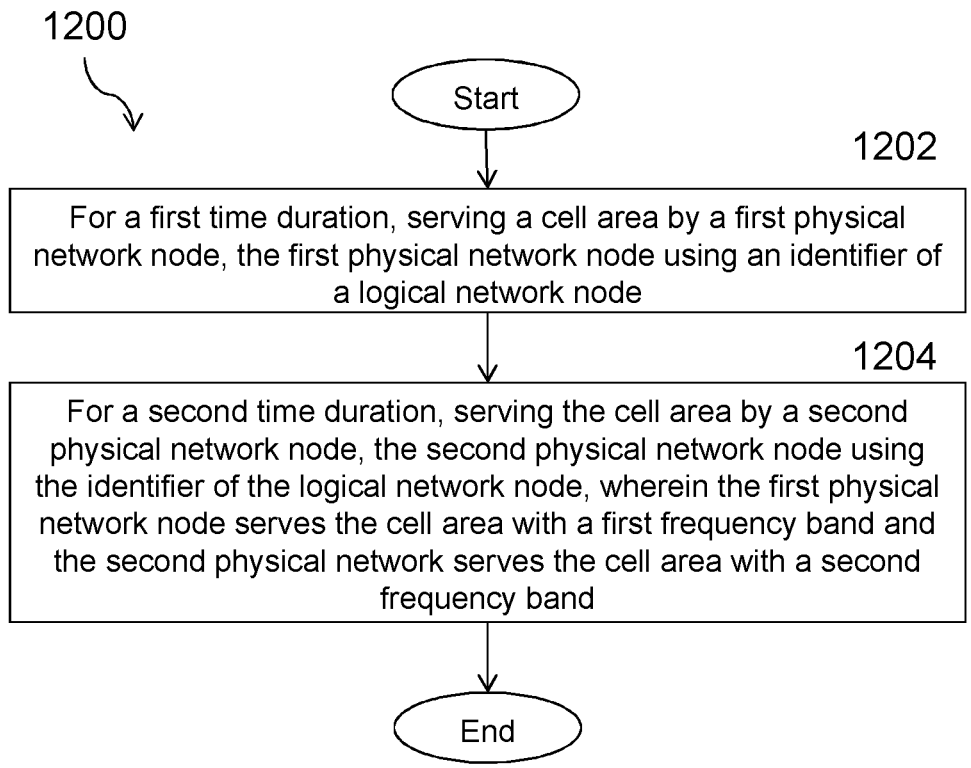
FIG. 19 illustrates another example method by a network node, according to certain embodiments.

FIG. 19 depicts a method 1200 by a network node, according to certain embodiments. At step 1202, for a first time duration a cell area is served by a first physical network node. The first physical network node uses an identifier of a logical network node. At step 1204, and for a second time duration, the cell area is served by a second physical network node. The second physical network node uses the identifier of the logical network node. The first physical network node serves the cell area with a first frequency band, and the second physical network node serves the cell area with a second frequency band.

In a particular embodiment, the first physical network node comprises a first satellite gateway, and the second physical network node comprises a second satellite gateway.

In a particular embodiment, the first physical network node comprises a first gNodeB, and the second physical network node comprises a second gNodeB.

In a particular embodiment, the logical network node comprises a TAI.

In a particular embodiment, the TAI comprises a public land mobile network and a tracking area code.

In a particular embodiment, the first frequency band and the second frequency band overlap.

In a particular embodiment, the first frequency band and the second frequency band do not overlap.

In a particular embodiment, serving the cell area by the first physical network node includes sending at least one paging message to a wireless device, and serving the cell area by the second physical network node includes sending the at least one paging message to the wireless device.

In a particular embodiment, at the end of the first time duration, the network node ceases to send the at least one paging message to the wireless device and broadcasts that the first physical network node has ceased sending the at least one paging message to the wireless device.

In a particular embodiment, at the end of the first time duration, the network node ceases to send the at least one paging message to the wireless device and broadcasts at least one of frequency location, SMTC, PCI, or other information associated with the second physical network node.

Figure 20:
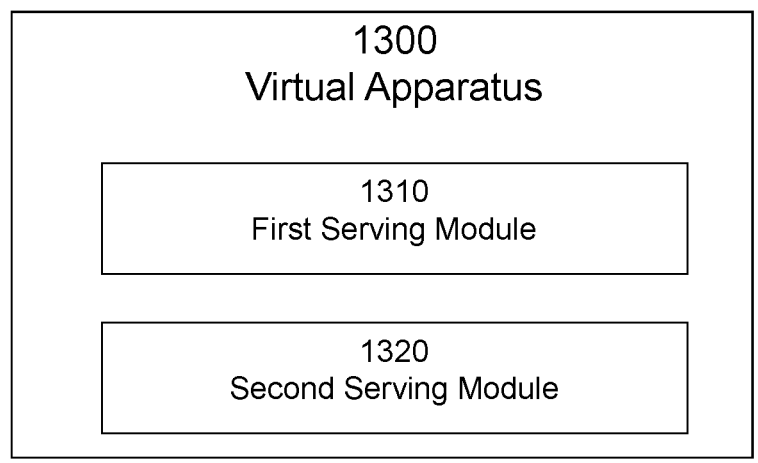
FIG. 20 illustrates another exemplary virtual computing device, according to certain embodiments.

FIG. 20 illustrates a schematic block diagram of a virtual apparatus 1300 in a wireless network (for example, the wireless network shown in FIG. 6). The apparatus may be implemented in a wireless device or network node (e.g., wireless device 110 or network node 160 shown in FIG. 6). Apparatus 1300 is operable to carry out the example method described with reference to FIG. 19 and possibly any other processes or methods disclosed herein. It is also to be understood that the method of FIG. 19 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first serving module 1310, second serving module 1320, and any other suitable units or modules of apparatus 1300 to perform corresponding functions according one or more embodiments of the present disclosure.

According to certain embodiments, first serving module 1310 may perform certain of the serving functions of the apparatus 1300. For example, first serving module 1310 may serve, for a first time, a cell area is served by a first physical network node. The first physical network node uses an identifier of a logical network node and serves the cell area with a first frequency band.

According to certain embodiments, second serving module 1320 may perform certain other of the serving functions of the apparatus 1300. For example, second serving module 1320 may serve, for a second time duration, the cell area by a second physical network node. The second physical network node uses the identifier of the logical network node and serves the cell area with a second frequency band.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 21:
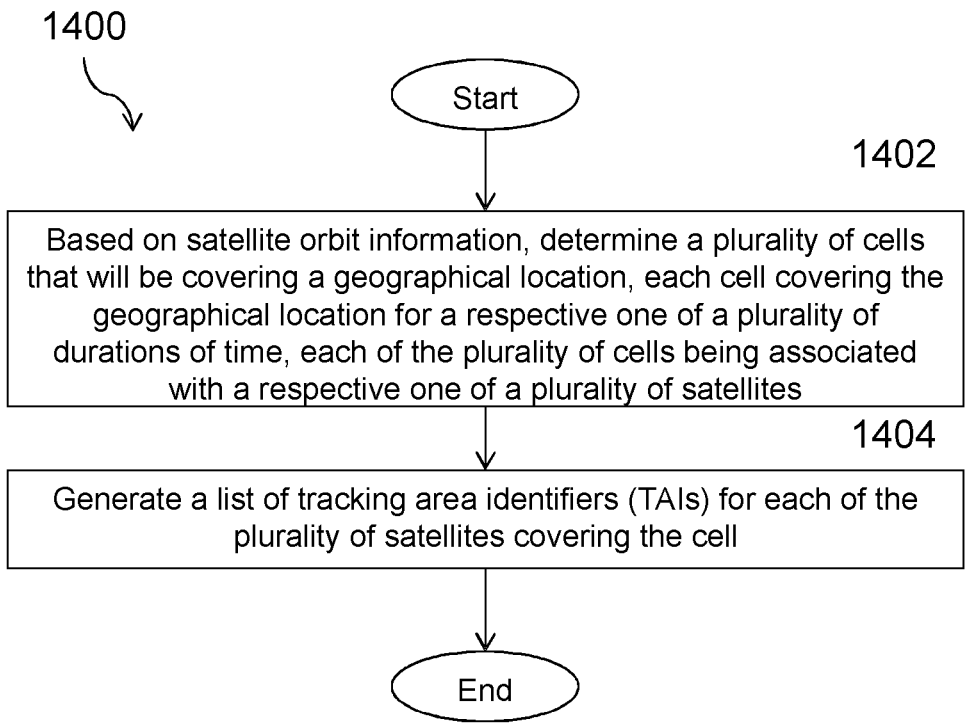
FIG. 21 illustrates another example method by a network node, according to certain embodiments.

FIG. 21 depicts a method 1400 by a network node, according to certain embodiments. At step 1402, based on satellite orbit information, a plurality of cells that will be covering a geographical location are determined. Each cell covers the geographical location for a respective one of a plurality of durations of time, and each of the plurality of cells is associated with a respective one of a plurality of satellites. At step 1404, a list of TAIs is generated for each of the plurality of satellites covering the cell.

Figure 22:
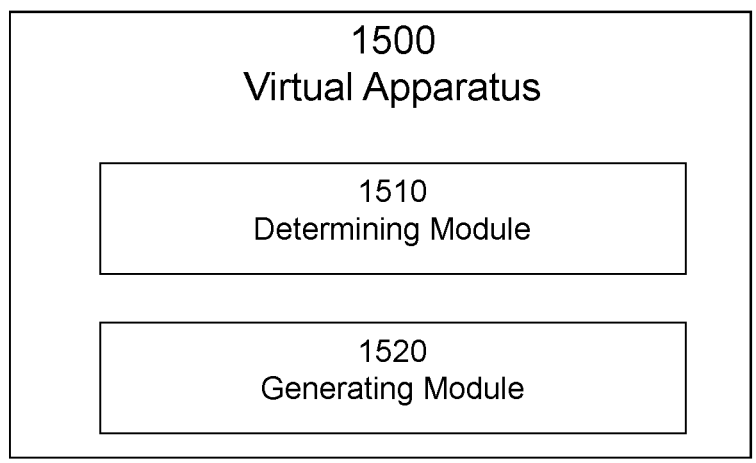
FIG. 22 illustrates another exemplary virtual computing device, according to certain embodiments.

FIG. 22 illustrates a schematic block diagram of a virtual apparatus 1500 in a wireless network (for example, the wireless network shown in FIG. 6). The apparatus may be implemented in a wireless device or network node (e.g., wireless device 110 or network node 160 shown in FIG. 6). Apparatus 1500 is operable to carry out the example method described with reference to FIG. 21 and possibly any other processes or methods disclosed herein. It is also to be understood that the method of FIG. 21 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1510, generating module 1520, and any other suitable units of apparatus 1500 to perform corresponding functions according one or more embodiments of the present disclosure.

According to certain embodiments, determining module 1510 may perform certain of the determining functions of the apparatus 1500. For example, determining module 1510 may determine a plurality of cells that will be covering a geographical location based on satellite orbit information. Each cell covers the geographical location for a respective one of a plurality of durations of time, and each of the plurality of cells is associated with a respective one of a plurality of satellites.

According to certain embodiments, generating module 520 may perform certain of the generating functions of the apparatus 1500. For example, generating module 520 may generate a list of TAIs for each of the plurality of satellites covering the cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
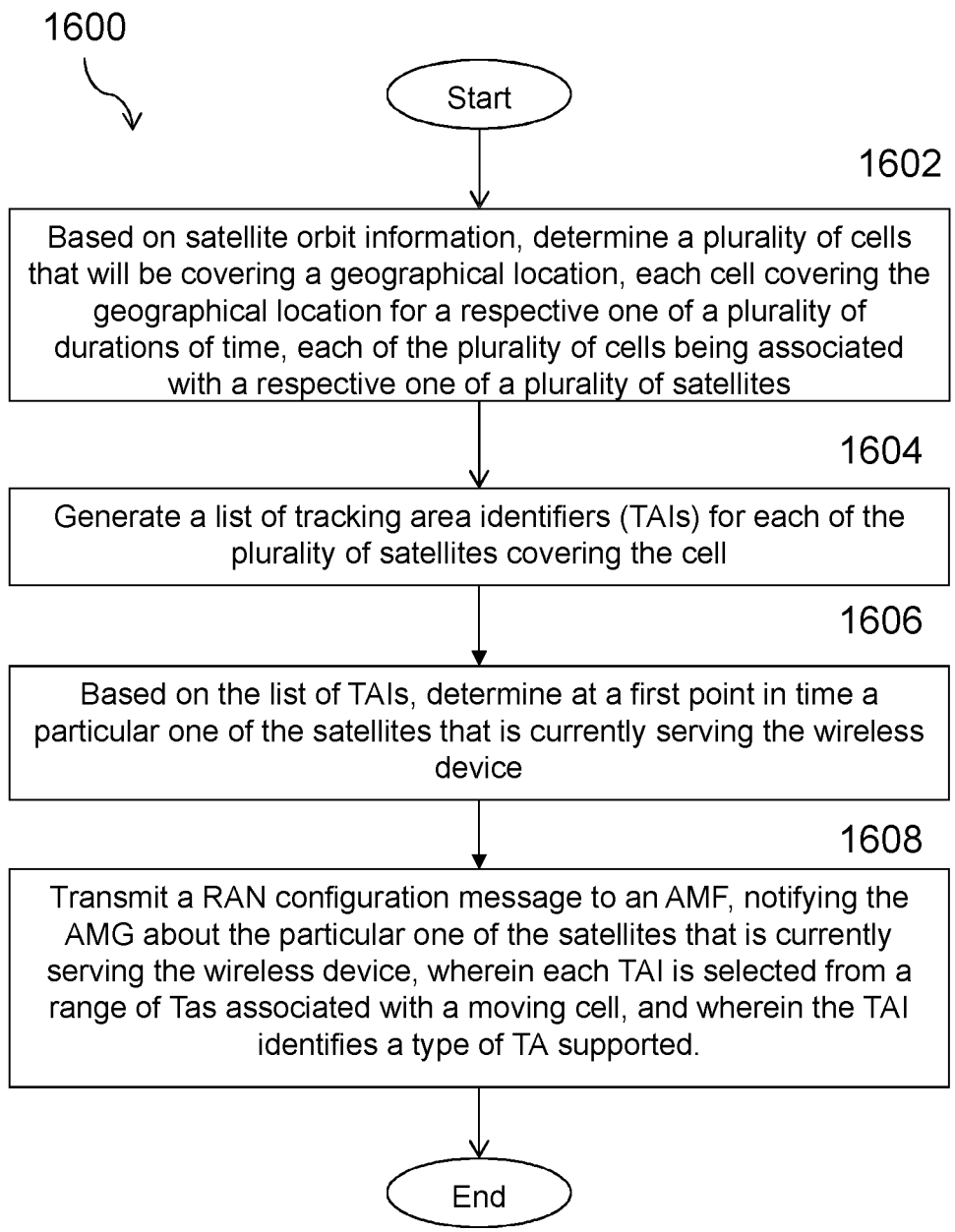
FIG. 23 illustrates another example method by a network node, according to certain embodiments.

FIG. 23 depicts a method 1600 by a network node 160, according to certain embodiments. At step 1602, based on satellite orbit information, the network node 160 determines a plurality of cells that will be covering a geographical location. Each cell covers the geographical location for a respective one of a plurality of durations of time. Each of the plurality of cells are associated with a respective one of a plurality of satellites. At step 1604, a list of at least one TAI is generated for each of the plurality of satellites covering the cell. Based on the list of at least one TAI, a particular one of the satellites that is currently serving the wireless device at a first point in time is determined, at step 1606. At step 1608, a RAN configuration message is transmitted to an AMF, notifying the AMF about the particular one of the satellites that is currently serving the wireless device. Each TAI is selected from a range of TAs associated with a moving cell, and the TAI identifies a type of TA supported.

In a particular embodiment, the list of the at least one TAI is generated based on at least one of a location of the wireless device and a mobility pattern of the wireless device.

In a particular embodiment, each TAI in the list of the at least one TAI is associated with a time stamp associated with a time duration during which the TAI is valid.

In a particular embodiment, the network node 160 transmits the list of the at least one TAI to a wireless device.

Figure 24:
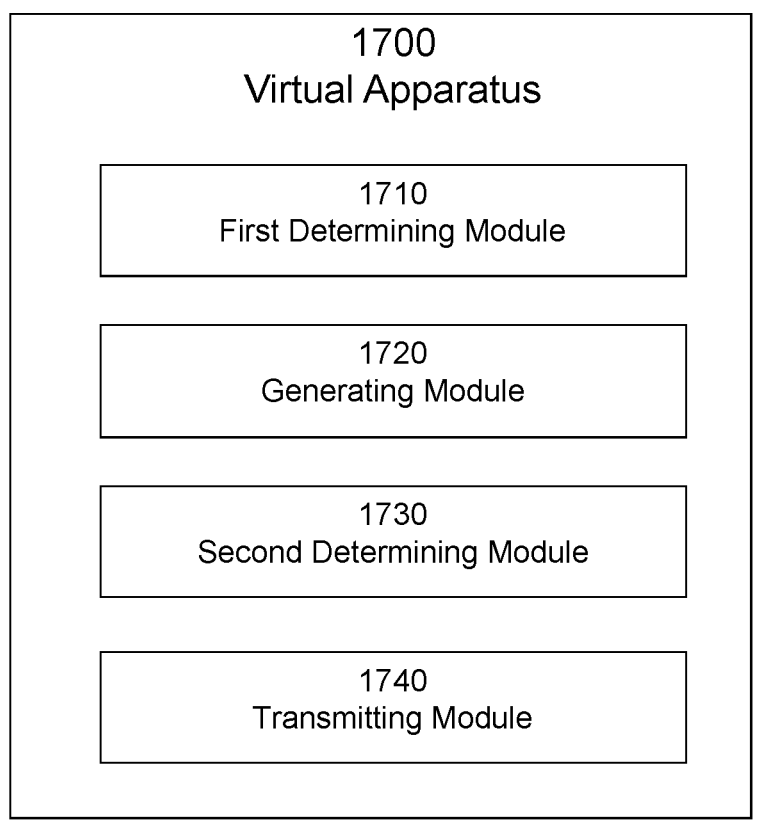
FIG. 24 illustrates another exemplary virtual computing device, according to certain embodiments.

FIG. 24 illustrates a schematic block diagram of a virtual apparatus 1700 in a wireless network (for example, the wireless network shown in FIG. 6). The apparatus may be implemented in a wireless device or network node (e.g., wireless device 110 or network node 160 shown in FIG. 6). Apparatus 1700 is operable to carry out the example method described with reference to FIG. 23 and possibly any other processes or methods disclosed herein. It is also to be understood that the method of FIG. 23 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first determining module 1710, generating module 1720, second determining module 1730, transmitting module 1740, and any other suitable units of apparatus 1700 to perform corresponding functions according one or more embodiments of the present disclosure.

According to certain embodiments, first determining module 1710 may perform certain of the determining functions of the apparatus 1700. For example, first determining module 1510 may determine, based on satellite orbit information, a plurality of cells that will be covering a geographical location. Each cell covers the geographical location for a respective one of a plurality of durations of time. Each of the plurality of cells are associated with a respective one of a plurality of satellites.

According to certain embodiments, generating module 1720 may perform certain of the generating functions of the apparatus 1700. For example, generating module 1720 may generate a list of at least one TAI for each of the plurality of satellites covering the cell.

According to certain embodiments, second determining module 1730 may perform certain other of the determining functions of the apparatus 1700. For example, second determining module 1730 may determine, based on the list of at least one TAI, a particular one of the satellites that is currently serving the wireless device at a first point in time.

According to certain embodiments, transmitting module 1740 may perform certain of the transmitting functions of the apparatus 1700. For example, transmitting module 1740 may transmit a RAN configuration message to an AMF, notifying the AMF about the particular one of the satellites that is currently serving the wireless device. Each TAI is selected from a range of TAs associated with a moving cell, and the TAI identifies a type of TA supported.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

EXAMPLE EMBODIMENTS

Embodiment 1. A method comprising: for a first time duration, serving a cell area by a first physical network node, the first physical network node using an identifier of a logical network node; and for a second time duration, serving the cell area by a second physical network node using, the second physical network node using the identifier of the logical network node.

Example Embodiments 2. The method of embodiment 1, wherein the cell area comprises fixed geographical area.

Example Embodiment 3. The method of any one of embodiments 1 to 2, wherein: the first physical network node comprises a first satellite gateway, and the second physical network node comprises a second satellite gateway.

Example Embodiment 4. The method of any one of embodiments 1 to 3, wherein: the first physical network node comprises a first gNodeB, and the second physical network node comprises a second gNodeB.

Example Embodiment 5. The method of any one of embodiments 1 to 4, wherein the logical network node comprises a tracking area identity (TAI).

Example Embodiment 6. The method of embodiment 5, wherein the TAI comprises a public land mobile network and a tracking area code.

Example Embodiment 7. The method of any one of embodiments 1 to 6, wherein the first physical network node serves the cell area with a first frequency band and the second physical network node serves the cell area with a second frequency band.

Example Embodiment 8. The method of embodiment 7, wherein the first frequency band and the second frequency band overlap.

Example Embodiment 9. The method of embodiment 7, wherein the first frequency band and the second frequency band do not overlap.

Example Embodiment 10. The method of any one of embodiments 1 to 9, wherein: serving the cell area by the first physical network node comprises sending at least one paging message to a wireless device, and serving the cell area by the second physical network node comprises sending the at least one paging message to the wireless device.

Example Embodiment 11a. The method of embodiments 10, further comprising: at the end of the first time duration, ceasing to send the at least one paging message to the wireless device; and broadcasting that the first physical network node has ceased sending the at least one paging message to the wireless device.

Example Embodiment 11b. The method of embodiments 10, further comprising: at the end of the first time duration, ceasing to send the at least one paging message to the wireless device; and broadcasting at least one of frequency location, SMTC, PCI, or other information associated with the second physical network node.

Example Embodiment 12. A method comprising: based on satellite orbit information, determining a plurality of cells that will be covering a geographical location, each cell covering the geographical location for a respective one of a plurality of durations of time, each of the plurality of cells being associated with a respective one of a plurality of satellites; and generating a list of tracking area identifiers (TAIs) for each of the plurality of satellites covering the cell.

Example Embodiment 13. The method of embodiment 12, wherein the list of TAIs is generated based on at least one of a location of the wireless device and a mobility pattern of the wireless device.

Example Embodiment 14. The method of any one of embodiments 12 to 13, wherein the list of TAIs is transmitted to the wireless device when the wireless device attaches to the network.

Example Embodiment 15. The method of any one of embodiments 12 to 14, wherein each TAI in the list of TAIs is associated with a time stamp associated with a time duration during which the TAI is valid.

Example Embodiment 16. The method of any one of embodiments 12 to 15, wherein the method is performed by a wireless device and the method further comprises: using the list of TAIs for UE tracking area management.

Example Embodiment 17. The method of any one of embodiments 12 to 15, wherein the method is performed by a network node and the method further comprises: transmitting the list of TAIs to a wireless device.

Example Embodiment 18. The method of embodiment 17, further comprising: based on the list of TAIs, determining at a first point in time, a particular one of the satellites that is currently serving the wireless device; and transmitting a RAN configuration message to an AMF, notifying the AMF about the particular one of the satellites that is currently serving the wireless device.

Example Embodiment 19. The method of any one of embodiments 12 to 18, wherein each TAI is selected from a range of TAs associated with a moving cell.

Example Embodiment 20. The method of embodiment 19, wherein the TAI identifies a type of TA supported.

Example Embodiment 21. A wireless device for improving network efficiency, the wireless device comprising: processing circuitry configured to perform any of the steps of any of the Example Embodiments 12 to 20; and power supply circuitry configured to supply power to the wireless device.

Example Embodiment 22. A base station for improving network efficiency, the base station comprising: processing circuitry configured to perform any of the steps of any of the Example Embodiments 1 to 20; power supply circuitry configured to supply power to the wireless device.

Example Embodiment 23. A user equipment (UE) for improving network efficiency, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 12 to 20; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 24. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of Example Embodiments 1 to 20.

Example Embodiment 25. The communication system of the pervious embodiment further including the base station.

Example Embodiment 26. The communication system of the previous 2 embodiments, further including the UE, wherein the UE is configured to communicate with the base station.

Example Embodiment 27. The communication system of the previous 3 embodiments, wherein: the processing circuitry of the host computer is configured to execute a host application, thereby providing the user data; and the UE comprises processing circuitry configured to execute a client application associated with the host application.

Example Embodiment 28. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of Example Embodiments 1 to 20.

Example Embodiment 29. The method of the previous embodiment, further comprising, at the base station, transmitting the user data.

Example Embodiment 30. The method of the previous 2 embodiments, wherein the user data is provided at the host computer by executing a host application, the method further comprising, at the UE, executing a client application associated with the host application.

Example Embodiment 31. A user equipment (UE) configured to communicate with a base station, the UE comprising a radio interface and processing circuitry configured to performs the of the previous 3 embodiments.

Example Embodiment 32. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Example Embodiments 1 to 20.

Example Embodiment 33. The communication system of the previous embodiment, wherein the cellular network further includes a base station configured to communicate with the UE.

Example Embodiment 34. The communication system of the previous 2 embodiments, wherein: the processing circuitry of the host computer is configured to execute a host application, thereby providing the user data; and the UE's processing circuitry is configured to execute a client application associated with the host application.

Example Embodiment 35. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of Example Embodiments 12 to 20.

Example Embodiment 36. The method of the previous embodiment, further comprising at the UE, receiving the user data from the base station.

Example Embodiment 37. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of Example Embodiments 12 to 20.

Example Embodiment 38. The communication system of the previous embodiment, further including the UE.

Example Embodiment 39. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 40. The communication system of the previous 3 embodiments, wherein: the processing circuitry of the host computer is configured to execute a host application; and the UE's processing circuitry is configured to execute a client application associated with the host application, thereby providing the user data.

Example Embodiment 41. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 42. A method implemented in a communication system including a host computer, a base station and a user equipment (UE), the method comprising: at the host computer, receiving user data transmitted to the base station from the UE, wherein the UE performs any of the steps of any of the Example Embodiments 12 to 20.

Example Embodiment 43. The method of the previous embodiment, further comprising, at the UE, providing the user data to the base station.

Example Embodiment 44. The method of the previous 2 embodiments, further comprising: at the UE, executing a client application, thereby providing the user data to be transmitted; and at the host computer, executing a host application associated with the client application.

Example Embodiment 45. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 46. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of Example Embodiments 1 to 20.

Example Embodiment 47. The communication system of the previous embodiment further including the base station.

Example Embodiment 48. The communication system of the previous 2 embodiments, further including the UE, wherein the UE is configured to communicate with the base station.

Example Embodiment 49. The communication system of the previous 3 embodiments, wherein: the processing circuitry of the host computer is configured to execute a host application; the UE is configured to execute a client application associated with the host application, thereby providing the user data to be received by the host computer.

Example Embodiment 50. A method implemented in a communication system including a host computer, a base station and a user equipment (UE), the method comprising: at the host computer, receiving, from the base station, user data originating from a transmission which the base station has received from the UE, wherein the UE performs any of the steps of any of Example Embodiments 12 to 20.

Example Embodiment 51. The method of the previous embodiment, further comprising at the base station, receiving the user data from the UE.

Example Embodiment 52. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
BLE/CE Bandwidth/Coverage Extended
BS Base Station
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eMBB Enhanced Mobile BroadBand
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GEO Geostationary Orbit
GERAN GSM EDGE Radio Access Network
gNB gNode B (a base station in NR; a Node B supporting NR and connectivity to NGC)
GNSS Global Navigation Satellite System
GPS Global Positioning System
GSM Global System for Mobile communication
GW Gateway
HARQ Hybrid Automatic Repeat Request
HO Handover
HSPA High Speed Packet Access
HRPD High Rate Packet Data
LEO Low Earth Orbit
LOS Line of Sight
LPP LTE Positioning Protocol LTE Long-Term Evolution
MAC Medium Access Control
MBMS Multimedia Broadcast Multicast Services
MB SFN Multimedia Broadcast multicast service Single Frequency Network
MBSFN ABS MBSFN Almost Blank Subframe
MDT Minimization of Drive Tests
MEO Medium Earth Orbit
MIB Master Information Block
MME Mobility Management Entity
MSC Mobile Switching Center
Msg1 Message 1
Msg2 Message 2
Msg3 Message 3
Msg4 Message 4
NGC Next Generation Core
NGSO Non-Geostationary Orbit
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RTT Round-Trip Time
RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SR Scheduling Requests
SS Synchronization Signal
SSS Secondary Synchronization Signal
TA Tracking Area
TBS Transport Block Size
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:
1. A method performed by a network node, the method comprising:
for a first time duration, serving a cell area by a first physical network node, the first physical network node using an identifier of a logical network node, serving the cell area by the first physical network node comprising sending at least one paging message to a wireless device;
at the end of the first time duration, ceasing to send the at least one paging message to the wireless device;
broadcasting that the first physical network node has ceased sending the at least one paging message to the wireless device;
for a second time duration, serving the cell area by a second physical network node, the second physical network node using the identifier of the logical network node, serving the cell area by the second physical network node comprising sending the at least one paging message to the wireless device; and
the first physical network node serving the cell area with a first frequency band and the second physical network node serving the cell area with a second frequency band.
2. The method of claim 1, wherein:
the first physical network node comprises a first satellite gateway, and
the second physical network node comprises a second satellite gateway.
3. The method of claim 1, wherein:
the first physical network node comprises a first gNodeB, and
the second physical network node comprises a second gNodeB.
4. The method of claim 1, wherein the logical network node comprises a tracking area identity (TAI).
5. The method of claim 4, wherein the TAI comprises a public land mobile network and a tracking area code.

6. A network node comprising:

processing circuitry configured to:

for a first time duration, serve a cell area by a first physical network node, the first physical network node using an identifier of a logical network node, serving the cell area by the first physical network node comprising sending at least one paging message to a wireless device;

at the end of the first time duration, cease to send the at least one paging message to the wireless device;

broadcast that the first physical network node has ceased sending the at least one paging message to the wireless device;

for a second time duration, serve the cell area by a second physical network node, the second physical network node using the identifier of the logical network node, serving the cell area by the second physical network node comprising sending the at least one paging message to the wireless device; and the first physical network node serving the cell area with a first frequency band and the second physical network node serving the cell area with a second frequency band.

7. The network node of claim 6, wherein:
the first physical network node comprises a first satellite gateway, and
the second physical network node comprises a second satellite gateway.

8. The network node of claim 6, wherein:
the first physical network node comprises a first gNodeB, and
the second physical network node comprises a second gNodeB.

9. The network node of claim 6, wherein the logical network node comprises a tracking area identity (TAI).

10. The network node of claim 9, wherein the TAI comprises a public land mobile network and a tracking area code.

11. The network node of claim 6, wherein the first frequency band and the second frequency band overlap.

12. The network node of claim 6, wherein the first frequency band and the second frequency band do not overlap.

13. The network node of claim 6, wherein the processing circuitry is configured to:
at the end of the first time duration, cease to send the at least one paging message to the wireless device; and
broadcast at least one of frequency location, SS/PBCH Block Measurement Time Configuration (SMTC), Physical Layer Cell Identifier (PCI), or other information associated with the second physical network node.

* * * * *